United States Patent [19]

Frey et al.

[11] Patent Number: 5,388,266
[45] Date of Patent: Feb. 7, 1995

[54] MANAGEMENT OF DATA OBJECTS USED INTAIN STATE INFORMATION FOR SHARED DATA AT A LOCAL COMPLEX

[75] Inventors: Jeffrey A. Frey, Fishkill; Ronald F. Hill, Wappingers Falls; Jeffrey M. Nick, Fishkill; Michael D. Swanson, Poughkeepsie; Ambrose A. Verdibello, Jr., Millbrook, all of N.Y.

[73] Assignee: International Business Machines Corporation, Armonk, N.Y.

[21] Appl. No.: 860,797

[22] Filed: Mar. 30, 1992

[51] Int. Cl.[6] ............................................. G06F 12/08
[52] U.S. Cl. ............................ 395/700; 364/DIG. 1; 364/281.3; 364/281.7; 364/281.5
[58] Field of Search .................. 395/700; 364/DIG. 1, 364/281.3, 281.7, 281.5

[56] References Cited

U.S. PATENT DOCUMENTS

| | | | |
|---|---|---|---|
| 4,809,168 | 2/1989 | Hennessy et al. | 364/200 |
| 4,891,749 | 1/1990 | Hoffman et al. | 364/200 |
| 5,022,077 | 6/1991 | Bealkowski et al. | 380/4 |
| 5,170,472 | 12/1992 | Cwiakala et al. | 395/275 |

Primary Examiner—Kevin A. Kriess
Assistant Examiner—A. Katbab
Attorney, Agent, or Firm—Floyd A. Gonzalez

[57] ABSTRACT

Method and apparatus for creating and accessing data objects stored in a portion of the main memory of a data processing system which is inaccessible to programs. The data processing system includes a central processor for executing programs for processing data and a main memory for storing data and programs. The main memory is divided into a program accessible portion and a program inaccessible portion. Vector control objects and vector entries are stored in the program inaccessible portion of the main memory, with each vector entry having states the meaning of which are program defined. Tokens are generated to locate vector control objects in the program inaccessible portion of the main memory. Each vector control object includes a field for pointing to a vector entry for accessing and making observable to the central processor, the contents of a vector entry for indicating the status therein. The present invention also provides for the serialization of access to stored data objects such that the data objects may be released and reused without the possibility of a latent access to an object which is being reused.

31 Claims, 24 Drawing Sheets

FIG.5

LOCAL CACHE OF SYSTEM 1 24A

| NAME 50A | DATA 52A | 53A | STATE 54A |
|---|---|---|---|
| A | DATA | ADJ | VALID |
| C | DATA | ADJ | VALID |
| L | | | INVALID |
| X | DATA | ADJ | VALID |

LOCAL CACHE OF SYSTEM 2 24B

| NAME 50B | DATA 52B | 53B | STATE 54B |
|---|---|---|---|
| C | DATA | ADJ | VALID |
| B | DATA | ADJ | VALID |
| | | | INVALID |
| X | DATA | ADJ | VALID |

SES FACILITY-16

CACHE STRUCTURE-26

NAME (L)

DIRECTORY 60

| NAME 51 | STATE 61 | REG 62 |
|---|---|---|
| A | | |
| B | | |
| C | | |
| ⋮ | ⋮ | ⋮ |
| X | | |

DATA TABLE 55

| 56 | 57 |
|---|---|
| DATA AREA 1 | ADJ AREA 1 |
| DATA AREA 2 | ADJ AREA 2 |
| DATA AREA 3 | ADJ AREA 3 |
| ⋮ | ⋮ |
| DATA AREA M | ADJ AREA M |

DASD-40

NAMED DATA BLOCKS

FIG. 7 | IMAGE ID | INDEX | 0 | A | SEQUENCE NUMBER |

FIG. 8 | 0000000000 | LOCAL-CACHE-ENTRY NUMBER |

FIG. 9 | IMAGE ID | INDEX | 1 | A | SEQUENCE NUMBER |

FIG. 10 | 0000000000 | LIST-NOTIFICATION-ENTRY NUMBER |

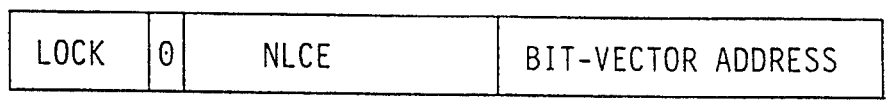
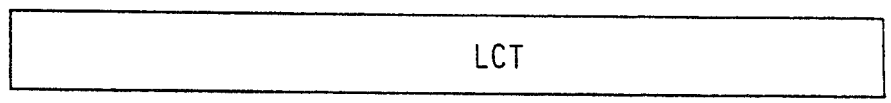
FIG. 12
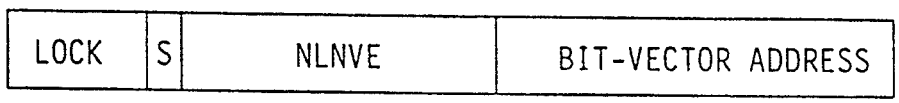
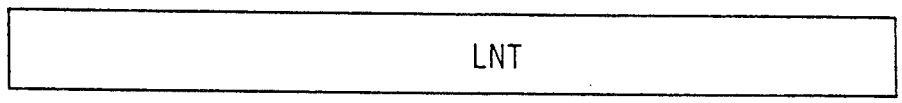
FIG. 14

FIG. 15

```
DISPATCHER   (WITHIN GLOBAL SRB SEARCH PATH)

TEST GLOBAL LNV SUMMARY
B0  ─────────────────────►   - RESET GLOBAL LNV SUMMARY
                             - USE CS TO INCREMENT EVENT.CNT
                             - IF CS MADE EVENT.CNT = 1
                                   SCHEDULE SRB PROCESS
    ◄─────────────────────

SRB

TOP:   SAVED.EVENT.CNT = EVENT.CNT
       FOR EACH LIST USER
         DO;
           TEST THE USER'S LNV SUMMARY
           IF LNV SUMMARY IS ACTIVE
             DO;
               RESET THE USER'S LNV SUMMARY
               USE CS TO INCREMENT STUB.EVENT.CNT
               IF CS MADE STUB.EVENT.CNT = 1
                   SCHEDULE STUB SRB
             END;
         END;
       USE CS TO CHANGE EVENT.CNT FROM SAVED.EVENT.CNT TO 0
       IF CS FAILED
           GOTO TOP

STUB

TOP:   SAVED.STUB.EVENT.CNT = STUB.EVENT.CNT
       CALL USER EXIT
       USE CS TO CHANGE STUB.EVENT.CNT FROM SAVED.STUB.EVENT.CNT TO 0
       IF CS FAILED
           GOTO TOP
```

FIG. 16

```
FOLLOWING SES COMMAND FAILURE OR VARY PATH XX ONLINE:

┌BEGIN;
│
│   GET SES FACILITY LOCK
│
│   SET TI(XX) = ON IN FACILITY CONTROL BLOCK
│
│   IF XX = TLCE STATUS AREA PATH, TI=ON IN STATUS AREA
│
│   ┌DO;
│   │
│   │   AMP XX
│   │
│   │   IF OK
│   │
│   │   ┌DO;
│   │   │   MARK PATH LOGICALLY ONLINE
│   │   └END;
│   │
│   └END;
│
│   RELEASE SES FACILITY LOCK
│
└END;
```

FIG. 17

FOLLOWING SES COMMAND FAILURE OR VARY PATH XX OFFLINE

BEGIN;
    GET SES FACILITY LOCK
    MARK PATH LOGICALLY OFFLINE
    SET TI(XX) = ON IN FACILITY CONTROL BLOCK
    IF XX = TLCE STATUS AREA PATH, TI=ON IN STATUS AREA
    DMP XX
    RELEASE SES FACILITY LOCK
END;

FIG. 18A

```
                        TLCE STATUS AREA

┌─┬──────┬─────┬─────────────────┬──────────────────┐
    │T│      │CHPID│/////////////////│ FACILITY CONTROL │
    │I│      │     │/////////////////│ BLOCK ADDRESS    │
    └─┴──────┴─────┴─────────────────┴──────────────────┘

TI= TLCE INTERSECT BIT

INPUT: LCT=(R2), LCEN=(R14), TLCETKN=(R15)
    MACRO EXPANSION EXAMPLE:
```

```
*     LM    0,1,0(15)    LOAD FIRST 2 WORDS OF TLCE STATUS AREA.
*                        LM GIVES DOUBLEWORD CONCURRENT FETCH.
*
*     LTR   0,0          TEST THE VALIDITY OF THE STATUS AREA       -150
*
*     BM    T001         IF HIGH ORDER BIT IS SET, STATUS AREA IS
*                        NOT VALID. THE MESSAGE PATH MAY BE OFFLINE.
*                        BRANCH TO TLCE SERVICE ROUTINE.
*
      TMPS  0            TEST THE MESSAGE PATH STATE OF THE —151
*                        ISC DESIGNATED IN THE TLCE STATUS AREA.
*
      BNZ   T001         IF ERROR-STATE-PENDING OR INVALID
*                        INTER-SYSTEM CHANNEL, BRANCH TO THE TLCE —152
*                        SERVICE ROUTINE TO FIND AN ALTERNATE PATH.
*
*
      TM    0(15),X'80'  TEST THE VALIDITY OF THE STATUS AREA AFTER —153
*                        THE TMPS. THIS IS DONE TO DETECT CONCURRENT
*                        MESSAGE PATH RECOVERY WHICH MAKES THE TLCE
*                        STATUS AREA INVALID AND THEN CLEARS THE
*                        MESSAGE-PATH-STATE OF THE PATH BETWEEN THE
*                        LM AND THE TMPS IN THIS INLINE MACRO.
*
      BO    T001         IF HIGH ORDER BIT IS NOW SET, RECOVERY FOR —155
*                        THE MESSAGE PATH MAY BE IN PROGRESS.
*                        BRANCH TO TLCE SERVICE ROUTINE.
*
```

FIG. 18B

```
        TVE   2,14              TEST THE LOCAL-CACHE VECTOR ENTRY AND ~156
*                               SET THE CONDITION CODE FOR THE USER.
*
        B     T002              EXIT
*
T001    DS    0H
*
        L     1,X'10'           LOAD CVT POINTER FROM PSA
            . . .
        BASR  0,1               BRANCH TO THE TLCE SERVICE ROUTINE.
*                               NOTE THAT THE SERVICE ROUTINE WILL
*                               RETURN WITH THE APPROPRIATE CONDITION
*                               CODE SET.
T002    DS    0H
```

```
INPUT: LCT, LCEN, TLCETKN
┌BEGIN
│   GET CPU LOCK FOR LEGAL CPU DISABLEMENT
│   SET RC=1 INITIALLY～167
│   ┌DO LOOP THROUGH ONLINE PATHS IN FCB (IF ADDRESS ¬= 0)
│   │   SELECT PATH XX
│   │   TMPS XX～160
│   │   IF CC=0 AND TI(XX)=0 THEN～162
│   │       ┌DO;
│   │       │   TVE LCT,LCEN～164
│   │       │   RC = TVE CONDITION CODE～168
│   │       │   LEAVE LOOP
│   │       └END;
│   └END;
│   SCHEDULE SES-SUPPORT FACILITY RECOVERY～166
│   RELEASE CPU LOCK
│   SET THE CONDITION CODE FROM THE RC VALUE～169
│   RETURN WITHOUT CHANGING THE CONDITION CODE
└END;
```

FIG. 21A

```
INPUT: TLCETKN

BEGIN;

GET SES FACILITY LOCK ―――171

CLEAR THE HEALTHY PATH MASK

┌DO LOOP THROUGH ONLINE PATHS (IF FCB ADDRESS ¬= 0)

SELECT PATH XX

IF TI(XX)=OFF THEN

┌DO;

ADD PATH XX TO 'HEALTHY PATH MASK' ―――172

└END;

TMPS XX                  ┐
                                 ├―174
        IF CC¬=0 THEN            ┘

┌DO;

CALL PATH RECOVERY SUBROUTINE ―――173

└END;

└END LOOP

┌DO LOOP THROUGH 'HEALTHY PATHS' FOUND

SELECT PATH XX

TMPS XX                  ┐
                                 ├―176
        IF CC¬=0 THEN            ┘

┌DO;

CALL PATH RECOVERY SUBROUTINE ―――177

└END;
```

170, 175

```
        ELSE
           ┌DO;
           │   LEAVE LOOP                                      ─175
           └END;
    └END LOOP

IF 'HEALTHY PATH MASK' IS NULL THEN
    ┌DO;
    │   ┌DO LOOP THROUGH LCTS / LNTS ASSOCIATED WITH THIS FACILITY
    │   │   DEFINE VECTOR WITH CLEAR VECTOR OPTION~178
    │   │   IF VECTOR IS A LIST-NOTIFICATION VECTOR THEN~182
    │   │      ┌DO;
    │   │      │   SVS SET LIST-NOTIFICATION-VECTOR LOCAL SUMMARY~184    ─180
    │   │      └END;
    │   └END LOOP
    │      SVS SET LIST-NOTIFICATION-VECTOR GLOBAL SUMMARY~185
    └END;

RESET TI-BITS FOR ALL ONLINE PATHS~186

UPDATE TLCE STATUS AREA WITH AN ONLINE PATH~187

RELEASE SES FACILITY LOCK~188
└END;
```

```
┌─BEGIN;
│
│    TI(XX) = ON IN FCB──190
│
│    IF XX = TLCE STATUS AREA PATH, TI=ON IN STATUS AREA──191
│
│    CMPS XX──192
│
│    IMP XX──193
│
│    IF PATH XX IS INACTIVE THEN                          ┐
│
│       ┌─DO;
│       │
│       │    REMOVE PATH XX FROM 'HEALTHY PATH MASK'      ├─195
│       │
│       │    AMP XX
│       │
│       └─END;                                            ┘
│
│    IF CMPS OR IMP OR AMP FAILED THEN                    ┐
│
│       ┌─DO;
│       │
│       │    REMOVE PATH XX FROM 'HEALTHY PATH MASK'
│       │                                                 ├─197
│       │    MARK PATH LOGICALLY OFFLINE
│       │
│       │    DMP XX
│       │
│       └─END;                                            ┘
│
└─END;
```

FACILITY CONTROL BLOCK

MANAGEMENT OF DATA OBJECTS USED INTAIN STATE INFORMATION FOR SHARED DATA AT A LOCAL COMPLEX

BACKGROUND OF THE INVENTION

The present invention is related to a data processing system having a central processor and main memory for storing data, and more particularly relates to creating and accessing data objects used to maintain state information for shared data at a local complex stored in a portion of the main memory which is not accessible to programming in the central processor.

Data processing systems are known in which processor interrupts are used for external device event reporting. Subchannels are also known which are defined by an installation procedure which resides in a hardware system area not available to programs being executed by the central processor unit (CPU). CPU instructions are provided to allow the operating system software to store and modify a limited set of data within the subchannel.

Architected control structures are also known which govern machine behavior such that address translation tables can be attached to the CPU through the specification of absolute or real storage addresses within CPU control registers. Storage areas available for use by application software typically reside in program addressable main storage. Addressable storage areas are accessed by program software via mapped storage addresses, but cannot be accessed via the same mapped storage addresses by the channel subsystem. The storage management of program defined areas is performed by the operating system software. The virtual mapping of program defined areas is performed by the operating system software.

SUMMARY OF THE INVENTION

The present invention includes a central processing complex (CPC) having a central processor (CPU) and a main storage unit. A structured external storage (SES) facility stores data, a portion of which is shared with the main storage. A channel subsystem having intersystem channels is provided for making transfers of data, messages and responses between the CPC and the SES facility. The CPC sends messages and data to the SES via the channel subsystem, and the SES sends responses, messages, and data to the CPC via the channel subsystem without causing an interrupt to the CPU. The messages from the SES to the CPC may be unsolicited in that they may not be in response to a request from the CPU.

The present invention provides for the creation and access of data objects by programming in non-program addressable storage under program control. The invention provides for serialization of accesses to the data objects such that changes to these data objects are correctly observed by programming. The present invention further provides for the serialization of access to the data objects in non-program addressable storage such that a data object will not be released and re-allocated to a new user before all other concurrent accesses have been completed, and that the data objects may be released from a user and re-allocated without the fear that a latent access to a released data object will be made after the data object is released.

It is an object of the present invention to use program defined storage areas to report unsolicited events from an external storage device to software running on a CPU.

It is another object of the present invention to provide program defined storage areas resident in the hardware system area and the use of specialized CPU instruction to manipulate those objects.

It is another object of the present invention to provide data objects in the hardware system area (HSA) which are subject to rules that apply to references to addressable main storage, in particular rules that apply to serialization of prefetches and delayed stores as defined by the IBM ESA/390 architecture.

It is another object of the present invention to use opaque tokens to uniquely identify a data object being accessed.

It is another object of the present invention to use tokens which are unique and non-reusable to uniquely identify a data object being accessed.

It is another object of the present invention to provide address mapping tables created and maintained by CPU microcode for the program defined data objects instead of the operating system software.

It is another object of the present invention to perform storage management for the program defined data objects by the CPU microcode and not by the operating system software.

It is another object of the present invention to provide a mapped addressing scheme commonly used by programs running on the CPU and by the channel subsystem which is independent of the execution environment or current addressing mode of the program.

It is another object of the present invention to provide rules for completing stores by the channel subsystem without the use of a subchannel.

It is another object of the present invention to provide for the use of the same serialization mechanism to govern access to a program defined data object by the CPU and the channel subsystem.

It is another object of the present invention to provide for validation of access by the CPU and the CSS to data objects in the non-program addressable storage area.

It is another object of the present invention to provide CPU instructions which assures valid accesses to the data objects without requiring explicit serialization.

These and other objects of the present invention will be apparent from the following more particular description of the preferred embodiment of the invention as illustrated in the drawings.

BRIEF DESCRIPTION OF THE DRAWINGS

FIG. 5 shows the three-level storage hierarchy of the system of FIG. 1;

FIG. 7 shows the format of a local-cache token;

FIG. 8 shows the format of a local-cache-entry number;

FIG. 9 shows the format of a list-notification token;

FIG. 10 shows the format of a list-notification-entry number;

FIG. 12 shows the format of a local-cache-token-table entry;

FIG. 14 shows the format of a list-notification-token-table-entry;

FIG. 15 is a high level logic diagram for list-notification vector polling;

FIG. 16 is a high level logic diagram for an activate message path operation;

FIG. 17 is a high level logic diagram for a deactivate message path operation;

FIGS. 18A and 18B, taken together, form a high level logic diagram for a test local-cache entry (TLCE) macro;

FIG. 20 is a high level logic diagram for a TLCE service routine which is called from the macro of FIGS. 18A and 18B;

FIGS. 21A and 21B, taken together, form a high level logic diagram of a SES-support facility recovery routine;

FIG. 22 is a high level logic diagram for a subroutine to recover a message path.

DESCRIPTION OF A PREFERRED EMBODIMENT

Figure 1:
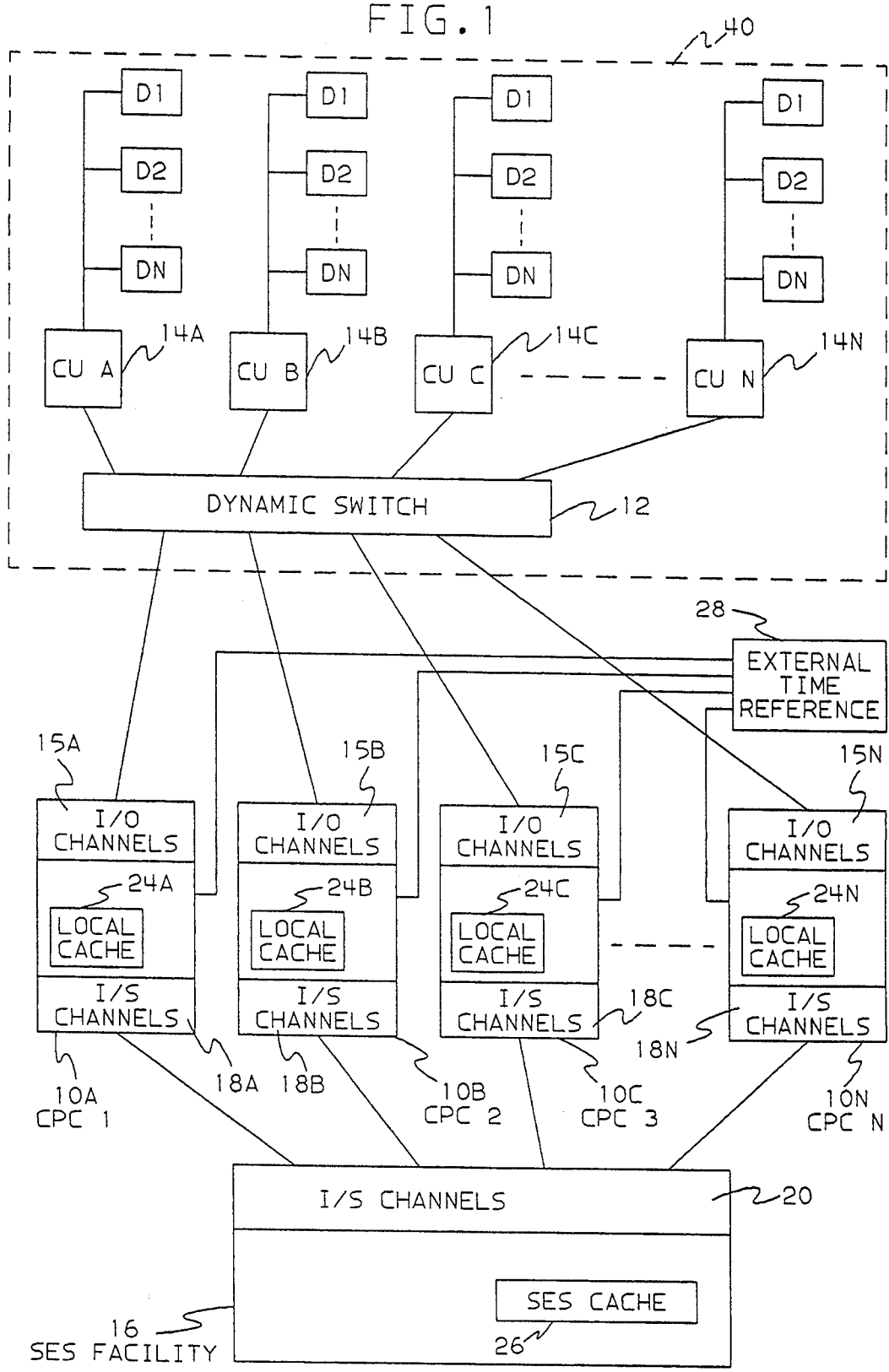
FIG. 1 is a block diagram of a data processing system of the present invention having multiple CPCs connected to an I/O system and a SES facility.

FIG. 1 is a block diagram of a data processing system using the present invention. The system of FIG. 1 includes multiple central processing complexes (CPCs) 10A through 10N which are connected to an input/output (I/O) system including a dynamic switch 12 controlling access to multiple I/O control units 14A through 14N. Each of the control units 14A through 14N controls one or more direct access storage devices (DASD) D1 through DN as shown. The dynamic switch 12 may be an ESCON Director dynamic switch available from IBM Corporation, Armonk, N.Y. Such a dynamic switch is disclosed in U.S. Pat. No. 5,107,489 for Switch and its Protocol for Making Dynamic Connections issued Apr. 21, 1992 and assigned to the owner of the present invention, which application is incorporated herein by reference. As is known, I/O commands and data are sent from a CPC to an I/O control unit through the dynamic switch 12 by means of I/O channels 15A through 15N of the respective CPCs 10A through 10N. Channel programs for a particular I/O channel are established by channel command words (CCWs) as is well known in the art.

Each of the CPCs 10A–10N are connected to a structured-external-storage (SES) facility 16, which contains storage accessible by the CPCs and which performs operations requested by programs in the CPCs. Each CPC 10A–10N contains intersystem (I/S) channels 18A–18N, respectively, which are connected to I/S channels 20 in the SES facility 16. The SES facility 16 is also referred to herein as a coupling facility. Even though only one SES facility 16 is shown in the embodiment of FIG. 1, it will be understood that multiple SES facilities may be provided for, each with its own I/S channels and message paths connected to all or some subset for the CPCs 10A–10N. It will be understood that the I/O channels 15 are part of the well known channel subsystem (CSS), which CSS also includes the I/S channels 18 disclosed herein, even though channels 15 and 18 are shown separately in FIG. 1 for convenience.

Each of the CPCs 10A–10N has a local cache 24A–24N, respectively, and the SES facility 16 contains one or more SES caches 26. The DASD devices D (referred to herein collectively as DASD 40), the local caches 24A–24N and the SES cache 26 form a three-level storage hierarchy. The lowest level of storage is the DASD 40, the intermediate level of storage is the SES cache 26, and the highest level is the local caches 24A–24N. The local caches 24A–24N are many times referred to herein as the local cache 24.

Each of the CPCs 10A–10N may be an IBM system following the Enterprise Systems Architecture/390 Principles of Operation as described in IBM publication SA22-7201-00. Each of the CPCs 10A–10N includes one or more central processing units (CPUs) which executes an operating system, such as IBM's MVS operation system, for controlling execution of programs for processing data, as is well known. One such program performs many of the SES operations mentioned herein. This program is referred to herein as "the program." Individual instructions of the program are identified as "CPU instructions."

An external time reference (ETR) 28 provides time stamps of control information to be written into a log to document recovery from failures, backing out of undesired operations, and for audit trails. The ETR 28 synchronizes the time clocks (not shown) of the CPCs 10A–10N to a precision equal to or less than the duration of the shortest externally visible operation, and uses fiber optic interconnect cables. The ETR 28 provides for cable length propagation time differences where those differences are important in order to be able to maintain synchronization to within the length of the mentioned external operation.

Figure 2:
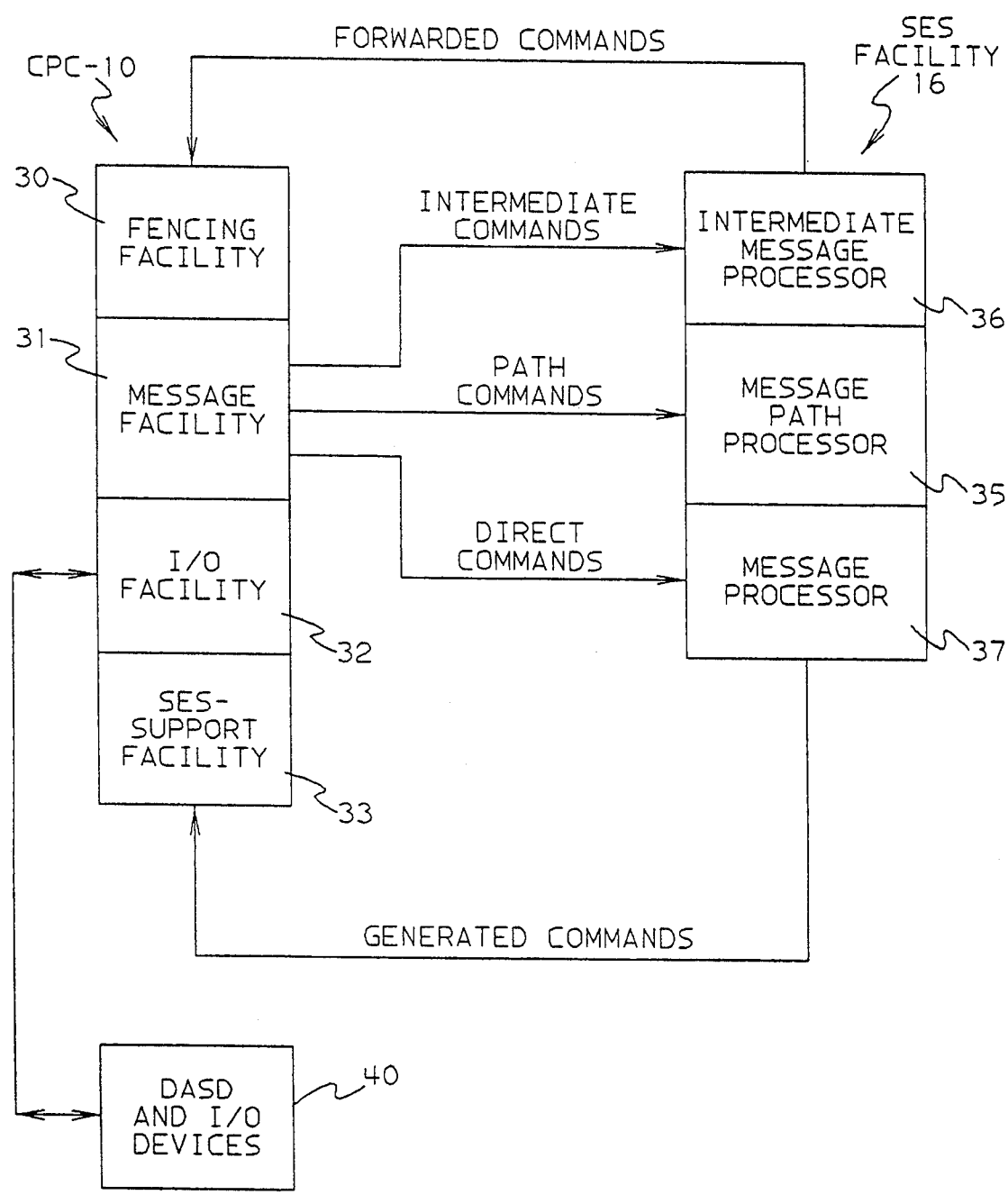
FIG. 2 is a portion of the system of FIG. 1 and shows several facilities of a single CPC connected to processors of the SES facility.

FIG. 2 shows a single CPC 10 connected to the SES facility 16. The CPC 10 includes a fencing facility 30, a message facility 31, an I/O facility 32 and a SES-support facility 33. The SES facility 16 includes a message-path processor 35, an intermediate-message processor 36, and a message processor 37. The message-path processor 35 executes message-path commands and performs message-path functions. The intermediate-message processor 36 forwards intermediate message commands to remote message processors such as the fencing facility 30. The message processor 37 supports structured storage of the list and cache type, to be explained herein in connection with FIG. 4.

Figure 3:
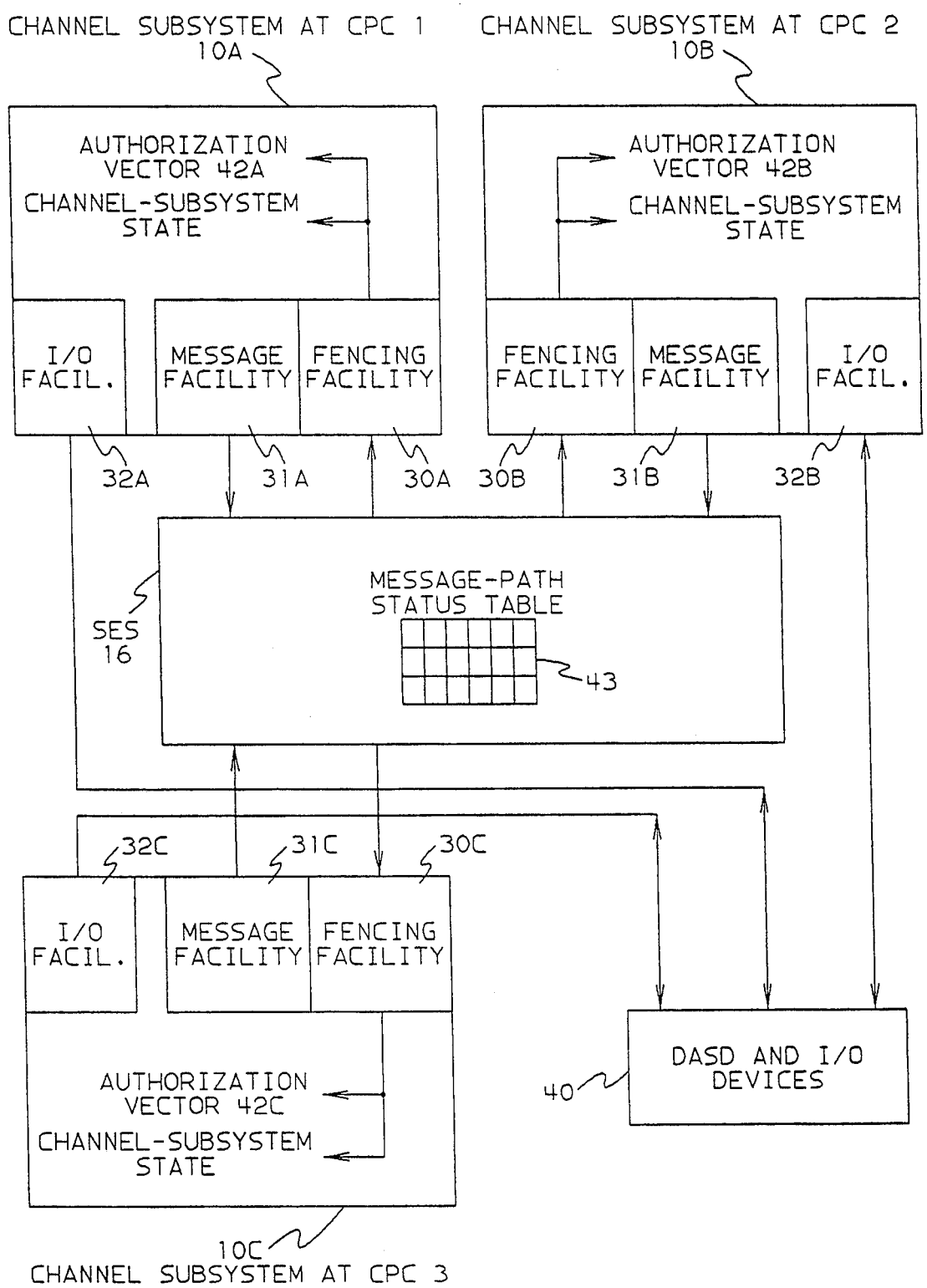
FIG. 3 is another portion of the system of FIG. 1 and shows an intermediate message processor of the SES facility and three CPCs.

The I/O facility 32 performs I/O operations and executes channel programs with DASD and I/O devices represented in FIGS. 2 and 3 at 40. The START SUBCHANNEL instruction is used to initiate an I/O operation in a manner well known in the art. The I/O facility is described the aforementioned ESA/390 Principles of Operation.

The message facility 31 performs message operations with the SES processors 35, 36 and 37, and with the fencing facilities 30. The SEND MESSAGE instruction is used to initiate a message operation with a SES facility 16 or fencing facility 30. This facility and instruction are disclosed in U.S. patent application Ser. No. 07/860,380 filed, Mar. 30, 1992 for "Communicating Messages Between Processors and a Coupling Facility" by D. A. Elko et al, incorporated herein by reference.

The fencing facility 30 executes commands that are received from other message facilities via the intermediate message processor. The commands are often issued by programs running on other CPCs. The commands operate on an authorization vector and a channel-subsystem-state indication, to be explained.

The SES-support facility 33 performs SES functions in the CPC 10 and executes commands generated by the message processor 37 in the SES facility 16.

Five separate types of message commands are defined and communicated between the hardware components of the SES facility 16 and the CPC 10. Path commands are communicated from the message facility 31 to the message path processor 35 via the SEND MESSAGE instruction over a selected message path associated with the subchannel. Path selection is performed by the control program of the CPC 10. Three path commands are defined: identify message path, activate message path and deactivate message path.

The program uses the SEND MESSAGE (SMSG) instruction to initiate an operation by the message processor 37 of FIG. 2. Execution of the message-processor operation is accomplished by sending command information to the SES facility 16 and returning response information summarizing the result. Additionally, the command may specify the transfer of data from main storage to SES storage, a SES-write operation, or the transfer of data from SES storage to main storage, a SES-read operation.

Direct commands are communicated from the message facility 31 to the message processor 37 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from the message processor 37 to the SES-support facility 33 in a designated CPC over a message path selected by the message processor 37 from the path group for the system. The SES support facility comprises a processor for execution of the generated commands communicated over a message path. Path selection is performed by the message-path processor 35. No data transfer occurs. Generated commands must be communicated on an message path. The generated commands include the cross-invalidate and list-notification commands, to be explained. Depending on the command, processing of the generated commands may or may not complete prior to completion of the associated direct command. However, a direct command does not complete before the action intended by the generated command is assured.

Intermediate commands are communicated for the message facility 31 to the intermediate-message processor 36 via the SEND MESSAGE instruction over a selected message path associated with the subchannel. Path selection is performed by the channel subsystem or CPU. Intermediate fencing commands are forwarded to the fencing facility 30 in a designated CPC.

Forwarded commands are communicated from the intermediate message processor 36 to a message processor. Path selection is performed by the message-path processor 35. Forwarded commands must be communicated on an active message path. Exactly one forwarded command is processed for each intermediate command that is received at the intermediate message processor 36. Processing of the forwarded command must complete prior to completion of the associated intermediate command.

Command execution charactistics at the SES facility 16 are disclosed in U.S. patent application Ser. No. 07/860,803 filed Mar. 30, 1992 for "Method and Apparatus for Coupling Data Processing Systems" by D. A. Elko et al, incorporated herein by reference.

All communications to a SES facility 16 from the CPC 10 may use the same message path, depending on the configuration, regardless of whether the destination is the message processor 37, message-path processor 35, or intermediate-message processor 36. All communications from the SES facility 16 to a CPC 10 may also use the same set of message paths, depending on the configuration, regardless of whether the destination is the fencing facility 30 or the SES-support facility 33.

The fencing facility 30 is a component of the ESA/390 channel subsystem. Fencing commands are issued by CPU programs, but they are executed by fencing facilities. Command execution involves fetching request operands from main storage, operating on storage objects at the fencing facility, and storing response operands in main storage.

Eight mechanisms exist for message paths: identification, activation, testing, deactivation, delivery of cross-invalidate or list notification commands, direct commands, responses and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at the SES facility 16 and the non-operational path is deactivated by the program over an alternate path. Selection and operations of message paths is disclosed in U.S. patent application Ser. No. 07/860,800 filed Mar. 30, 1992 for "Integrity of Data Objects Used to Maintain State Information for Shared Data at a local Complex" by D. A. Elko et al (Attorney Docket No. PO9-92-003); and U.S. patent application Ser. No. 07/860,647 filed Mar. 30, 1992 for "Recovery of Data Objects Used to Maintain State Information for Shared Data at a Local Complex" by J. A. Frey et al, all incorporated herein by reference.

Cache cross invalidation is performed by the SES facility 16 when, for instance, a write operation is executed for data in a SES cache 26 that is registered in one or more local caches 24A-24N. Before completing the SES write operation, the SES facility 16 sends a cross-invalidate signal to each system that contains a valid copy of the data in a local cache 24A-24N in order to maintain coherency of the local caches 24A-24N via a selected message path. This is disclosed in U.S. patent application Ser. No. 07/860,805 filed Mar. 30, 1992 for "Sysplex Shared Data Coherency Method and Means" by Elko et al, incorporated herein by reference.

Notification of list-state transition is performed by the SES facility 16 when a list operation is executed that causes a list which was empty to become not empty or that causes a list (to be discussed in connection with FIGS. 4 and 6) which was not empty to become empty. In either case, a list-notification command is sent to each system that is monitoring the list, informing the system of the state transition. This is disclosed in U.S. patent application Ser. No. 07/860,809 filed Mar. 30, 1992 for "Method and Apparatus for Notification of State Transitions for Shared Lists of Data Entries" by J. A. Frey, et al, incorporated herein by reference.

A fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a sysplex, that is, a system having multiple CPCs. This is disclosed in U.S. patent application Ser. No. 07/860,489 filed Mar. 30, 1992 for "Interdicting I/O and Messaging Operations in a Multi-system Complex" by D. A. Elko et al, incorporated herein by reference. Fencing commands are routed to the target by sending the command to the SES facility 16, which forwards the command to the target system image.

The SES facility 16 continuously monitors the state of the physical links used to communicate commands by a message-path status table 43 of FIG. 3. Any failure, temporary or permanent, that may result in the loss of or change in the physical connection causes all the message paths associated with the physical link, as recorded in the message-path status table 43, to be placed in the inactive state. Commands are not sent on these links until the program has renegotiated the connections and reactivated the message paths. This prevents improper connections, such as from movement of cables, from causing commands to be incorrectly routed.

In addition to the SES monitoring function, the program may intentionally deactivate paths or change the associated system identifier. The SES facility 16 serializes these routing configuration changes against delivering new cross-invalidate, list notification or system fencing commands while the renegotiation is in progress.

The path-selection mechanism provided by the message path processor 35 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in the SES facility 16 which forwards the command. The use of the intermediate message processor 36 avoids the need for direct connections among the CPCs in a sysplex.

FIG. 3 shows three CPCs and of the SES facility 16.

When a fencing command is received at the intermediate message processor, it is forwarded to the fencing facility 30. The path-selection function in the message-path processor 35 is invoked by the intermediate message processor 36 to deliver the fencing command to the specified system.

Figure 4:
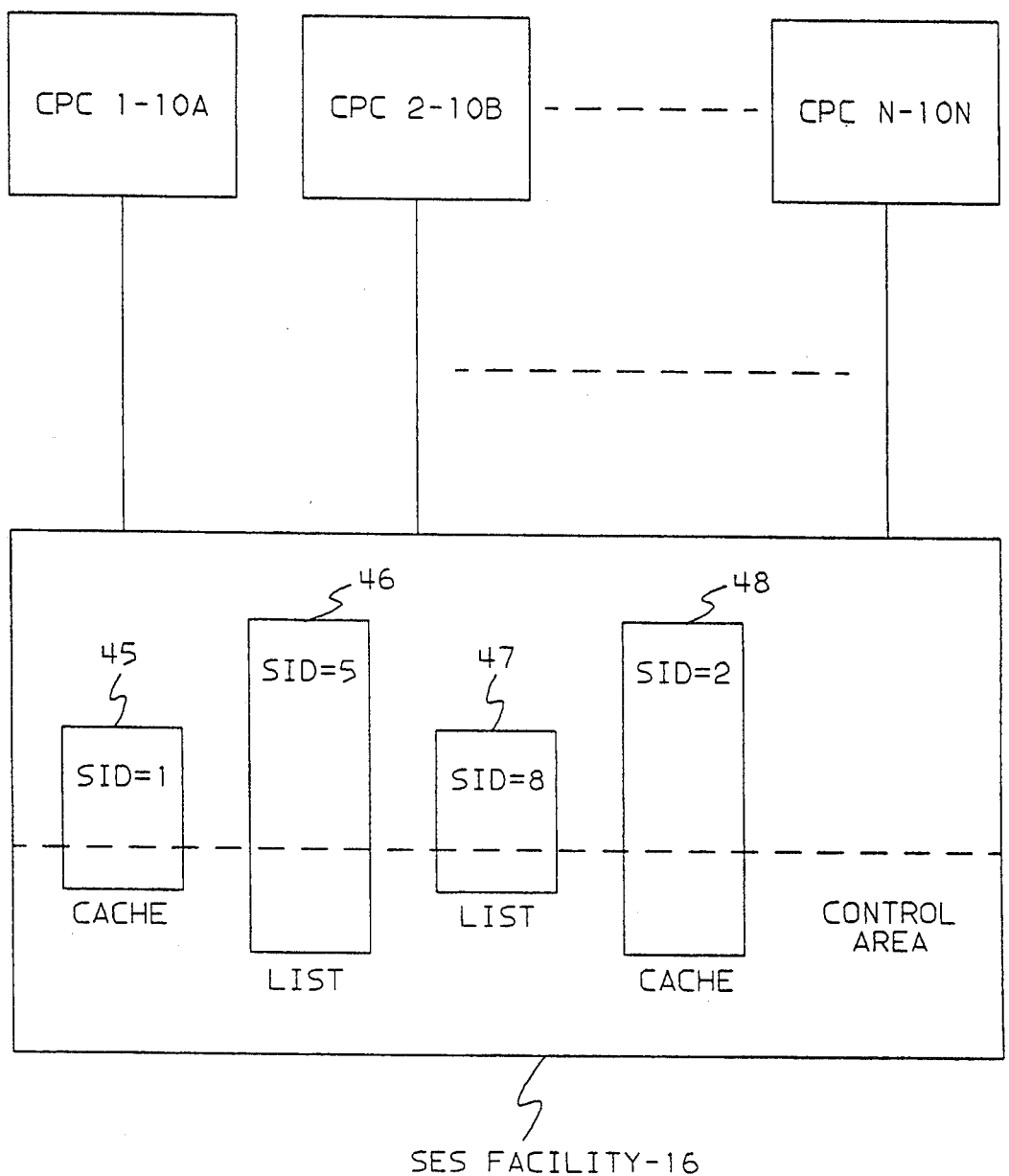
FIG. 4 is another portion of the system of FIG. 1 and shows multiple structures in a SES facility.

FIG. 4 shows a SES facility 16 having multiple structures 45-48. The message processor 37 provides the program with separate storage structures. Among these are the list structure (for example 46 and 47) and cache structure (for example 45 and 48). A set of commands is provided for each structure type, as well as additional commands for referencing global objects, to be discussed. The creation, deletion and attributes of a particular structure are controlled by the program through allocation and deallocation commands. FIG. 4 shows multiple structures of the same type which may exist concurrently. The allocated structures 45-48 reside in separate SES storage locations and are located by a structure identifier (SID). The SID value provides an identification of a target structure by a command. A command of a particular structure type, such as a cache-structure or list-structure command, may only address or alter the contents of a single structure of the given type.

SES storage contains data objects and control objects. The data objects may reside in any storage location, whereas the control objects are generally restricted to the control area.

Figure 6:
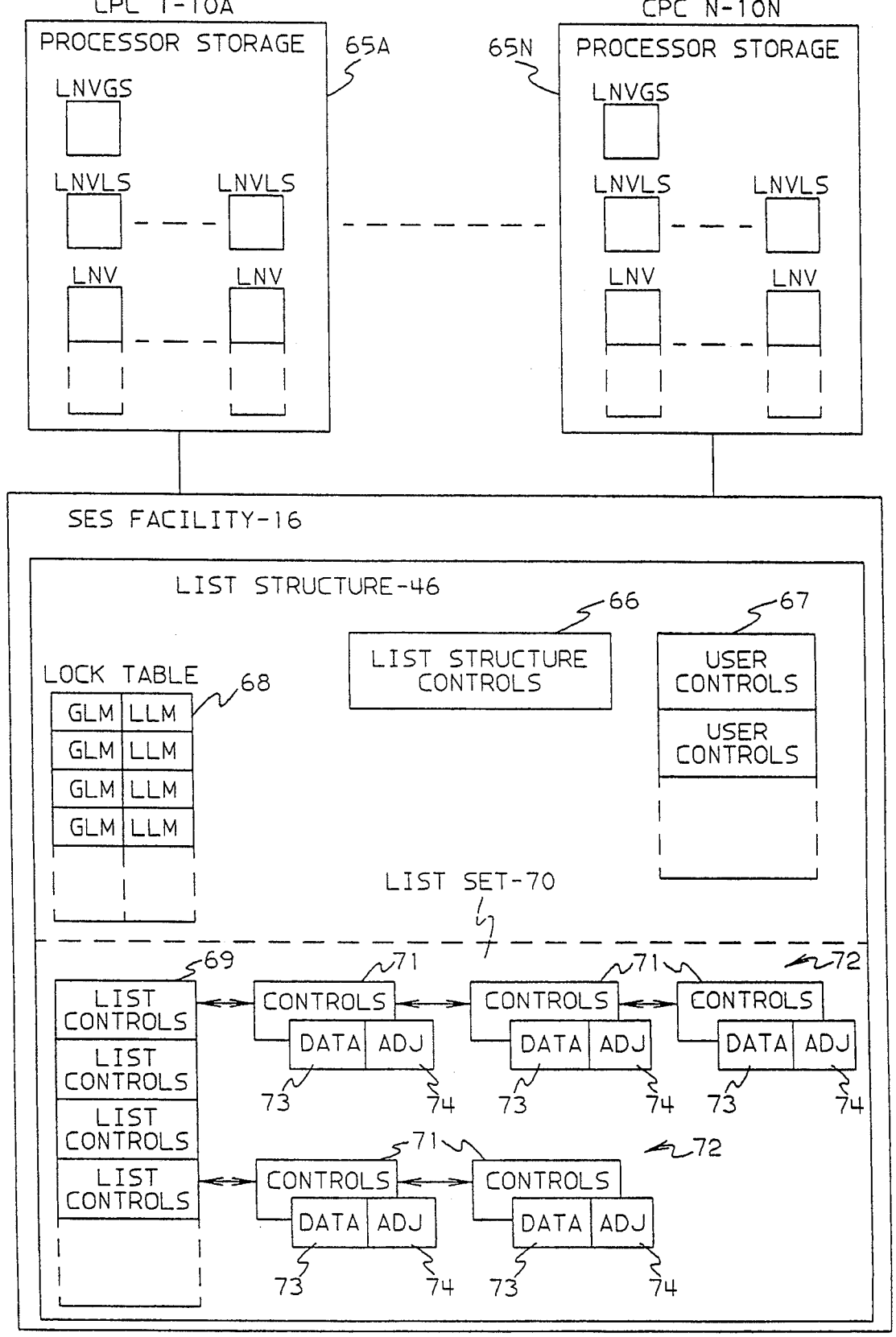
FIG. 6 illustrates one of the list structures of the structures shown in FIG. 4.

The partitioning of the SES storage and control area into structures as shown in FIGS. 4, 5 and 6 is managed by the program. The data objects are organized in tables or lists with an optional adjunct data area. The remaining objects are controls. The relative amounts of storage assigned to data and control objects are determined by program-specified parameters in the allocation commands. One of the cache structures 46 and 48 of FIG. 4 is shown as the SES cache 26 of FIG. 1.

As previously mentioned, each SES cache 26 of FIG. 1 is a component of a three-level storage hierarchy in a network of attached processors 10A-10N . FIG. 5 shows this hierarchy of storage. The lowest level of the hierarchy is DASD 40, the intermediate level is the SES cache 26, and the highest level is the local cache in processor storage. The DASD 40 and SES cache 26 are shared by the processors 10A-10N and are accessed by I/O operations and message operations, respectively. A local cache 24 is defined in each processor 10 and is accessed using CPU instructions.

As discussed in connection with FIG. 1, the processors 10A-10N are connected to the DASD 40 by I/O channels 15A-15N, and to the SES cache 26 by inter-system channels 18A-18N.

Referring to FIG. 5, data that moves through the storage hierarchy is given a name (columns 50A and 50B in the local caches 24A and 24B respectively, and column 51 in the SES cache 26). Data areas in the local caches 24A and 24B are shown in columns 52A and 52B, respectively, and optional adjunct data areas in the local caches 24A and 24B are shown in columns 53A and 53B, respectively. Each entry in the local caches 24A and 24B includes a state indicator shown in columns 54A and 54B, respectively. Each SES cache 26 may include a data table 55 which includes data areas (column 56) and adjunct data areas (column 57). The data sizes are variable with the range of variability being, in one embodiment, between 1 and n times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A–24N, or it may reside in a subset of local caches 24A–24N but not in the SES-cache storage 26.

Each local cache 24A–24N is a processor storage area maintained by the program by utilizing the respective SES-support facility 33 on the CPC containing the local cache vector defined by a DEFINE VECTOR instruction. The DEFINE VECTOR instruction initializes controls in the SES-support facility 33 and assigns a local-cache token.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure: size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES cache 16 issues generated commands to the SES-support facility 33, as discussed in connection with FIG. 2. A local cache 24 is attached to a SES cache structure 26 so that it may participate in the storage hierarchy. Coherency of copies of the data in the local caches 24A–24N and the the SES cache 26 is maintained by controls in the SES cache 26 and enforced by cross-invalidate commands issued as generated commands to the various SES-support facilities 33 in their respective CPCs 10A–10N. The building of a set of paths in the SES facility is disclosed in U.S. patent application Ser. No. 07/860,646 filed Mar. 30, 1992 for "Message Path Mechanism for Managing Connections Between Processors and a Coupling Facility" by Elko et al, incorporated herein by reference.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24) its state is recorded in the state column 61 and its location is recorded in the register column 62 by the SES-cache directory. State information indicates whether the data is changed, unchanged, or locked for castout, or resident in the SES-cache storage 26. Location information includes which of the local caches 24A–24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in the SES-support facility 33. The data is validated by CPU instructions and invalidated by SES-write and SES-invalidate operations. The valid state of the data is tested by a CPU instruction. A valid named data object must be registered in the SES-cache directory 60 in order to maintain local cache coherency. Local-cache coherency is maintained by the invalidation process. A registered local-cache entry may test as invalid. This is referred to as overindication of the invalid state and is permitted. This is disclosed in the aforementioned U.S. patent application Ser. No. 860,800, incorporated herein by reference.

The SES-cache storage 55 is normally smaller than the DASD storage 40. Thus, periodically the changed data must be transferred from the SES cache 26 to the backing DASD 40. This process, called castout, is controlled by the program and involves the following operations:

A SES-read for castout operation is issued that sets the castout serialization and copies the data block to main storage which may or may not be put in the local cache 24.

An I/O operation is executed that copies the data block to DASD 40.

A SES-unlock castout locks operation is issued that releases the castout serialization.

Multiple castout processes may coexist for a single one of the local caches 24A–24N. Whenever data is locked for castout, an identifier for the local cache 24A–24N and an identifier for the castout process are placed in the directory 60. This is disclosed in U.S. patent application Ser. No. 07/860,806 filed Mar. 30, 1992 for "Management of Data Movement from a SES Cache to DASD" by Elko et al, incorporated herein by reference.

The least recently used unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program. This is disclosed by U.S. patent application Ser. No. 07/860,807 filed Mar. 30, 1992 for "Storage Element for a shared Electronic Storage Cache" by Elko et al, incorporated herein by reference.

FIG. 6 shows the connection of CPCs 10A–10N to the SES facility 16 wherein each CPC 10A–10N includes processor storage 65A–65N, respectively. The contents of one list structure 46 of FIG. 4 is shown in FIG. 6. It will be understood that the other list structures of the SES facility would be the same as the list structure shown in FIG. 6.

The list structure 46 comprises list-structure controls 66, user controls 67, and, optionally, a lock table 68, and/or a list set 70 with list controls 69 and list-entry controls 71.

Each lock table 68 consists of a sequence of one or more entries, which are numbered consecutively starting at zero. The list-structure type determines whether all the lock-table entries have a global-lock-manager GML object, a local-lock-managers LLM object, or both.

The list-structure controls 66 are initialized when the list structure 46 is created. The list-structure controls 66 contains attributes of the structure, such as the structure size, list-structure type, lock-table-entry count, non-zero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list set 70 includes one or more lists represented by list controls 69, which are numbered consecutively starting at zero.

There are list controls 69 associated with each list 72. The list controls 69 contain a list-entry count, a list-entry-count limit, a list-monitor table, a list-state-transition count, and a user list control.

Each list 72 consists of a sequence of zero or more entries. The list-structure type determines whether all the list entries in the list set 70 have a data list entry 73, an adjunct list entry 74, or both.

One of the mentioned list-entry controls 71 is associated with each entry of a list 72. The controls 71 contain list-entry-location information and other information for managing the data in the adjunct area 74.

The list commands provide a means for writing a lock-table entry: that is a command may compare global-lock managers GLM and conditionally replace a global-lock manager GLM, a local-lock manager LLM, or both the global-lock and local-lock managers GLM and LLM. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72. This is disclosed in U.S. patent application Ser. No. 07/860,655 for "Method and Apparatus for Performing Conditional Operations on Externally Shared Data" by D. A. Elko et al, incorporated herein by reference.

The position of a list entry in a list 72 is determined when it is created, and may be changed when any entry in the list is created, deleted or moved. A list entry or list-entry position is located within a list set 70 by means of a list-entry identifier, an optional list-entry name, or by position.

A list-entry identifier is unique to a list set 70 and is assigned by the SES facility 16. A list-entry name is unique to a list set 70 at any particular instant and is provided by the program. The position is specified by means of a list number, a direction, and an optional list-entry key.

When list-entry keys exist, the keyed list entries are ordered by key with the lowest numerical key at the leftmost position. Elements with the same key value may be located by first or last within the same key value.

When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. This is disclosed in U.S. patent application Ser. No. 860,633 filed Mar. 30, 1992 for "Apparatus and Method for List Management in a Coupled Data Processing System" by J. A. Frey et al, incorporated by reference.

Normally, a data list entry 73 contains application-program data, and an adjunct list entry 74 contains the control data associated with it.

List monitoring is a SES list function which is optionally requested by a list-structure user by means of the attach-list-structure-user and the register-list-monitor commands. The attach-list-structure-user command identifies to the SES, the system on which the list-structure user resides and the list-notification vector LNV associated with the user. The register-list-monitor command allows the user to begin monitoring a list. This is disclosed in the aforementioned U.S. patent application Ser. No. 860,809, incorporated herein by reference.

Each processor storage 65A–65N includes a list-notification-vector global summary LNVGS, multiple list-notification-vector local summary LNVLS entries, and multiple list-notification vectors LNVs. The list-notification vector LNV is created by the DEFINE VECTOR instruction. The sizes or the LNVs may vary among different list users. The LNV is attached to the SES list structure 46 by means of the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state. It is set to 0 as a result of a list transition to the non-empty state.

For each LNV created on the CPC there exists a list-notification-vector local summary LNVLS. As a program specified option, the LNVLS is placed into the active state when any list-notification command is processed against the associated LNV indicating an empty to non-empty list transition. The LNVLS is not updated as a result of an non-empty to empty list state transition.

The update of the LNVLS is specified through use of a list-notification command option. The LNVLS is tested by the TEST VECTOR SUMMARY instruction and set or reset by the SET VECTOR SUMMARY instruction.

On a CPC there exists one list-notification vector global summary LNVGS per CPC image. The LNVGS is not updated as a result of a non-empty to empty list state transition and is set when any LNVLS is set by a list-notification command. The LNVGS is tested by the TEST VECTOR SUMMARY instruction and set or reset by the SET VECTOR SUMMARY instruction.

When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

Customer programs do not generally initiate SES functions directly. The functions are normally used by subsystems available from IBM Corp. under the trademark MVS/ESA. However, if customer programs do find it necessary to invoke SES functions directly, they will use interfaces provided by MVS/ESA. The MVS/ESA interface definitions are available from IBM Corp. and are well understood in the art.

Control of the SES-support facility 33 of FIG. 2 will now be discussed. The component of the SES configuration responsible for execution of SES functions in a central-processing complex (CPC) is the SES-support facility 33. It is comprised of the following items:
 CPU Instructions, which include:
 CLEAR MESSAGE PATH STATE(CMPS);
 DEFINE VECTOR(DV);
 SET VECTOR ENTRY(SVE);
 SET VECTOR SUMMARY(SVS);
 TEST MESSAGE PATH STATE(TMPS);
 TEST VECTOR ENTRY(TVE); and
 TEST VECTOR SUMMARY(TVS).
 Commands, which include:
 Cross-invalidate(XI); and
 List-notification(LN).
 Data Objects, which include:
 Local-Cache Vector(LCV);
 List-Notification Vector(LNV);
 List-Notification-Vector Global Summary (LNVGS);
 List-Notification-Vector Local Summary (LNVLS); and
 Message Path State(MPS).

The preceding items are a required part of the SES configuration. Cross-invalidate command execution and list-notification command execution are performed by the SES-support facility 33. The SES configuration consists of a SES facility 16 and a SES-support facility 33 resident on each CPC 10 attached to the SES facility 16. The SES-support facility 33 requires the message facility be installed on the CPC.

Data objects defined for the SES-support facility 33 are not placed in addressable storage and may be manipulated only by the CPU instructions and commands of the SES-support facility 33. The data objects may be placed, for instance, in the hardware system area (HSA), which is well understood in the art and is not addressable by users. References to these data objects follow the same rules that apply to references to addressable main storage. In particular, the unit of replacement is one byte and serialization applies to prefetches and delayed stores.

A vector token is a value used to uniquely identify a particular local-cache vector or list-notification vector, to be explained. A token is provided when a vector is defined and persists until the vector is released or a clear reset function is performed.

A token consisting of all zeros is invalid.

The clear reset function releases all local-cache and list-notification tokens, places the list-notification-vector global summary LNVGS into the reset state, and places all message path states into the cleared state. The clear reset function may also initialize the assignment process for local-cache and list-notification. Thus, following a clear reset function, a local-cache token or list-notification token may be assigned during the execution of a DEFINE VECTOR instruction that is identical to a token that existed prior to the execution of the clear reset function.

Local-Cache Vector (LCV)

The local-cache vector is created by the DEFINE VECTOR instruction. The sizes of the local-cache vectors may vary among different cache users. The local-cache vector is attached to the SES cache structure 45, 48 through use of the attach-local-cache command. Each entry in a local-cache vector indicates the valid or invalid state of a locally cached data element. A locally cached copy is said to be invalid when it is no longer current with respect to the shared copy registered at the SES facility. The TEST VECTOR ENTRY instruction is provided to interrogate the state of a locally cached data copy represented in the local-cache vector.

A local-cache vector entry is 1 when the associated locally cached data item is current with respect to the shared copy registered at the SES facility. A local-cache vector entry is 0 when the associated locally cached data item is not current with respect to the shared copy registered at the SES facility.

List-Notification Vector (LNV)

The list-notification vector is created by the DEFINE VECTOR instruction. The sizes of the list-notification vector may vary among different list users. The list-notification vector is attached to the SES list structure 46, 47 by means of the attach-list-structure-user command. Each entry in a list-notification vector may be associated with a list in the SES list structure. List transitions from the empty to non-empty and non-empty to empty states are detected by periodically polling the appropriate entry in the list-notification vector from the CPU. The TEST VECTOR ENTRY instruction is provided for this purpose.

A list-notification vector entry is set to 1 as a result of a list transition to the empty state. It is set to 0 as a result of a list transition to the non-empty state.

For each list-notification vector created on the CPC there exists a list-notification-vector local summary LNVLS. As a program specified option, the list-notification-vector local summary LNVLS is placed into the active state when any list-notification command is processed against the associated list-notification vector indicating an empty to non-empty list transition. The list-notification-vector local summary LNVLS is not updated as a result of a non-empty to empty list state transition. The update of the list-notification-vector local summary LNVLS is specified through use of a list-notification command option. The list-notification-vector local summary LNVLS is tested by the TEST VECTOR SUMMARY instruction and set or reset by the SET VECTOR SUMMARY instruction.

On a CPC there exists one list-notification-vector global summary LNVGS per CPC image. The list-notification-vector global summary LNVGS is placed into the active state when the list-notification-vector local summary LNVLS is placed into the active state to indicate an empty to non-empty SES list state transition. The list-notification-vector global summary LNVGS is not updated as a result of a non-empty to empty list state transition. The list-notification-vector global summary LNVGS is tested by the TEST VECTOR SUMMARY instruction and set or reset by the SET VECTOR SUMMARY instruction.

Message-Path States (MPS)

The SES-support facility 33 communicates with the SES facility 16 by means of message paths, each comprised of an intersystem link and an intersystem channel used to transmit and receive messages over the link. The intersystem link may be an optical link having a pair of optical conductor, one for sending and one for receiving. The state of a message path, as registered at the SES facility 16 and designated by a message-path identifier, is either active or inactive. The state of a message path, as registered at the SES-support facility 33 and designated by an intersystem-channel- path identifier and guest identifier, is either error-state-pending or not error-state-pending.

The message path is made error-state-pending whenever any condition is recognized on the message path which might preclude the SES-support facility 33 from processing commands initiated by an attached SES facility 16. The message path is made not error-state-pending initially as part of performing the clear reset function at the CPC and whenever a CLEAR MESSAGE PATH STATE instruction is issued to the message path.

When an intersystem channel of 18 is used to communicate with a SES facility 16, the message-path state as registered at the SES-support facility 33 is made error-state-pending whenever the intersystem channel leaves the operational-link configured state or an invalidate-buffer response is returned.

Before the CPC 10 can respond to an invalidate buffer request, the message path must first be made error-state-pending. This is necessary since the SES facility 16 may choose to abandon any further cross-invalidate or list-notification message processing on the message path and may place the path into the inactive state.

The message-path state observed at the SES-support facility 33 is not necessarily a direct reflection of the current state of physical elements comprising the message path.

Once indicated, the error-state-pending state persists until a CLEAR MESSAGE PATH STATE instruction is executed against the message path or a clear reset function is performed. As a result of these actions being taken, the error-state-pending indication is reset, independent of the current physical state of the message path.

The state of a message path as observed at the SES-support facility 33 is not necessarily a direct reflection of the corresponding state of the path in the SES facility.

The error-state-pending state reported to the program by means of the TEST MESSAGE PATH STATE instruction is an indication that some condition was encountered which might have prevented successful processing of commands on the message path.

Some non-error conditions may preclude the successful receipt of messages and therefore cause error-state-pending to be indicated for the message path. Placement of an operational link into a quiesced state is an example of such a condition. However, if the message path is active at the SES facility 16 and is not selected for delivery of a command to a target CPC while such a condition is present, the path will remain active even though error-state-pending is indicated at the target CPC. Further, the state of a message path in the SES-support facility 33 is affected by the execution of the CLEAR MESSAGE PATH STATE instruction. The state of a message path in the SES facility 16 is affected by the execution of the activate message path and deactivate message path commands.

When a TEST MESSAGE PATH STATE instruction indicates that the message path is error-state-pending, the program should issue the identify-message-path command to determine the state of the message path at the SES facility 16.

Conditions causing error-state-pending to be indicated for a message path include the following:

Link failures involving the loss of one or more link fibers, link protocol errors, loss of synchronization for longer than the link-interval duration, or a malfunction in the inter-system channel;

External means such as power off, physical deconfiguration of a CHPID, or removal of a cable;

Recognition of a not-operational sequence (NOS) or offline sequence (OLS) on the link;

Recognition of an invalidate-buffer request which occurs as a result of a message timeout; and Placement of an operational link into a quiesced state.

Storage Model for Local Cache and List Notification Vectors

The local cache vectors LCV and list notification vectors LNV occupy processor storage locations not addressable by the program by means of virtual, absolute or real storage addresses. Specific CPU instructions are defined to provide access to one or more entries within a local cache vector LCV or list notification vector LNV. The effective address of the byte of processor storage containing the vector entry being accessed is provided to these instructions.

For the purposes of this definition, the term "effective address" is used to denote the byte of processor storage containing the vector entry being accessed before translation, if any, occurs by the machine. Effective addresses of local cache vector LCV and list notification vector LNV entries are assigned by the DV instruction. Unlike virtual storage addresses, the byte of processor storage containing a vector entry is accessed with at most one effective address. There is a 1:1 mapping of vector entry effective address to processor storage location.

In particular, the following aspects of the ESA/390 architecture, as they relate to main-memory, apply to local cache and list notification vectors LCVs and LNVs.

Sequence of Storage References

Conceptually, the CPU processes instructions one at a time, with the execution of one instruction preceding the execution of the following instruction. The sequence of events implied by this processing is sometimes called the conceptual sequence.

Each operation appears to the program to be performed sequentially, with the current instruction being fetched after the preceding operation is completed and before the execution of the current operation is begun. This appearance is maintained on the CPU, even though storage implementation characteristics and overlap of instruction execution with storage accessing may cause actual processing to be different. The results generated are those that would have been obtained if the operations had been performed in the conceptual sequence.

Interlocks for Storage References

As described in the previous section, CPU operation appears to that CPU to be performed sequentially: the results stored by one instruction appear to be completed before the next instruction is fetched. If two effective addresses have the same value and map to the same storage location, the effective addresses are said to be the same.

When all accesses to a storage location are made by using the same effective address, then the above rule is strictly maintained, as observed by the CPU itself.

Storage Operand References

A storage operand reference is the fetching or storing of the explicit operand in the storage location specified by the instruction.

During the execution of an instruction, all or some of the storage operands for that instruction may be fetched, intermediate results may be maintained for subsequent modification, and final results may be temporarily held prior to placing them in storage. Stores caused by channel programs do not necessarily affect these intermediate results. Storage operand references are of three types: fetches, stores, and updates.

Storage Operand Fetch References

When the bytes of a storage operand participate in the instruction execution only as a source, the operand is called a fetch-type operand, and the reference to the storage location is called a storage operand fetch reference. All bits within a single byte of a fetch reference are accessed concurrently.

Storage Operand Store References

When the bytes of a storage operand participate in the instruction execution only as a destination, the operand is called a store-type operand and the reference to the storage location is called a storage operand store reference. All bits within a single byte of a store reference are accessed concurrently.

The CPU may delay placing results in storage. There is no defined limit on the length of time that results may remain pending before they are stored. This delay does not affect the sequence in which results are placed in storage. The results of one instruction are placed in storage after the results of all preceding instructions have been placed in storage and before any results of the succeeding instructions are stored, as observed by channel programs and other CPU programs. The results of any one instruction are stored in the sequence specified for that instruction.

Storage Operand Update References

In some instructions, the storage operand location participates both as a source and a destination. In these cases, the reference to the location first consists in a fetch and subsequently in a store. The operand is called update-type operand, and the combination of the two accesses is referred to as an update reference.

For SES-support-facility instructions which update individual bits within a byte of storage, the update reference is interlocked against certain accesses by other CPUs. Such an update reference is called an interlocked-update reference. The fetch and store accesses associated with an interlocked-update reference do not necessarily occur one immediately after the other, but all store accesses and the fetch and store accesses associated with interlocked-update references by other CPUs are prevented from occurring at the same location between the fetch and the store accesses of an interlocked-update reference. Accesses by the channel may not occur to the location during the interlock period.

Within the limitations of the above requirements, the fetch and store accesses associated with an update reference follow the same rules as the fetches and stores described in the previous sections.

Single Access References

A fetch reference is said to be a single-access reference if it appears as though the value is fetched in a single-access to each byte of the data field. A store reference is said to be a single-access reference if it appears as though a single store access occurs to each byte location of the data field. An update reference is said to be a single-access reference if both the fetch and store accesses are each single-access.

When a storage operand store reference is not a single-access reference, the value placed at a byte location is not necessarily the same for each store access; thus, intermediate results in a single byte location may be observed by other CPUs and by channel programs.

Except for the accesses associated with multiple access references and stores associated with storage change and restoration for DAT-associated access exceptions, (as identified in the ESA/390 principles of operation), all storage operand references are single-access references.

CPU Serialization

All interruptions and the execution of certain instructions cause a serialization of CPU operations. A serialization operation consists in completing all conceptually previous storage accesses by the CPU, as observed by other CPUs and by channel programs, before the conceptually subsequent storage accesses occur.

A serializing function affects the sequence of storage accesses that are under the control of the CPU in which the serializing function takes place. It does not necessarily affect the sequence of storage accesses under the control of other CPUs and of channel programs.

Following is a description of the CPU Instructions. It will be understood that the condition codes referred to herein are those condition codes returned to the program status word (PSW) as well understood in the art.

Clear Message Path State

The message-path-state of the selected message path is cleared to indicate not error-state-pending and the result is indicated in the condition code.

General register 0 designates the inter-system channel path identifier of the selected message path.

Condition code 0 is set and the message-path-state of the selected message path is cleared to indicate not error-state-pending.

Condition code 3 is set and no other action is taken when general register 0 designates an invalid inter-system channel.

When the operation completes, the new state of the selected message path is visible to any CPU observing that message path state by means of a TEST MESSAGE PATH STATE instruction.

A serialization function is performed before the operation begins and again after the operation is completed. As is the case for all serialization, this serialization applies only to this CPU; other CPUs are not necessarily serialized.

Resulting Condition Code:

| | |
|---|---|
| 0 | Message-path-state cleared; |
| 1 | —; |
| 2 | —; |
| 3 | Invalid Inter-system channel. |

CLEAR MESSAGE PATH STATE (CMPS) is intended for use as part of a process initiated to recover SES-support facility resources as a result of finding a message path to be error-state-pending in response to a TEST MESSAGE PATH STATE (TMPS) instruction. The resources to be recovered include any failing message paths themselves and any local-cache vectors LCVs or list-notification vectors LNVs accessed via the failing message paths.

The appropriate recovery action in cases where cross-invalidate or list-notification commands may have been lost due to the lack of any available message path is to over-indicate modification to cache data elements represented by entries in a local-cache vector LCV and to over-indicate list transition to the non-empty state for lists represented in a list-notification vector LNV.

The appropriate recovery action for message paths found to be error-state-pending should include reset of the error-state-pending condition via execution of a CMPS instruction, followed by path validation and re-activation if necessary via an identify-message-path (IMP) and activate-message-path (AMP) command sequence.

CMPS must be issued to a message path prior to path validation via IMP and activation of the path via AMP.

Otherwise, an error involving the message path, occurring in the window of time between successful AMP execution and CMPS issuance, could go undetected, resulting in loss of the initiative to again activate the path. A subsequent TMPS to the failing message path would find the path not-error-state-pending, resulting in a data integrity exposure if a TEST VECTOR ENTRY (TVE) instruction was then used to test a local-cache vector entry which had been residually left in the valid state.

The same exposure would result if a CMPS instruction was issued to reset the message-path state after finding the message path active in response to an IMP command. The path could fail immediately after completion of the IMP command and before the CMPS instruction execution. The error would not be detected via subsequent execution of a TMPS instruction to the failing message path.

The program is responsible to set an indication, referred to herein as a test-local-cache-entry-macro-intersect (TI) bit, before issuing the CMPS instruction, which can be tested in conjunction with issuance of a TMPS instruction to determine if an available path to an attached SES facility exists.

This is necessary because CMPS resets the error-state-pending condition, irrespective of whether the message path is physically non-operational or inactive. Since CMPS must be issued before path validation and activation via an IMP and AMP command sequence to cover the window described above, the program must set an indication TI bit that the message path is currently not available.

Note that it is the responsibility of the program to similarly set such an indication TI bit before execution of a deactivate-message-path (DMP) command, since the resulting inactive state of a path in the SES facility 16 is not observable via execution of a TMPS instruction.

The aforementioned indication TI bit set by the program must remain observable until after the processing to re-activate the message path is successfully completed.

The program-specified indication TI bit must not be reset until after the effect of the message path failure has been determined on local-cache and list-notification vectors LCVs and LNVs accessed via the message path and any necessary vector recovery action has been taken.

Otherwise, a data integrity exposure could result if a TVE instruction was executed against a local-cache vector LCV which contained residual data as a result of the loss of one or more cross-invalidate commands. This could occur if the issuance of a TMPS instruction was allowed to find the path not-error-state-pending and the program-specified indication was reset prior to clearing the local-cache vector.

The indication set by the program must not be reset for a recovered message path, without having first cleared all local vectors accessed via that path, unless another message path to the attached SES facility has been found to have been available throughout the entire recovery process for any failed message paths to that SES facility 16.

This is accomplished by re-checking the state of a message path which was initially found to be active prior to the start of recovery for any failed message path to the SES facility 16, after completing the recovery for all failed message paths. If the subject message path is still active, then it is true that no cross-invalidate or list-notification commands have been lost during the recovery for any failed paths. Therefore, vector clearing is not required.

It is only necessary for the program to find one path available for the receipt of cross-invalidate or list-notification commands in order to rely on the integrity of the local-cache or list-notification vectors LCVs or LNVs. This is possible because the SES facility 16 cannot consider cross-invalidate or list-notification processing successfully completed until the command has been processed by a target CPC or action has been taken to cause the error-state-pending condition to be indicated and made observable for all message paths to the target CPC which were active at the time of command execution.

Failure to verify that a message path which was initially found to be active is still available after completion of any path recovery for paths connecting to the SES facility 16, can result in a data integrity exposure. The available message path can fail immediately after being tested via TMPS, such that a cross-invalidate or list-notification command could be lost prior to any path recovery action being taken on behalf of any other paths to the SES facility.

The following scenario demonstrates this point. Assume message path X failed, has been physically repaired, and is now error-state-pending at the SES support facility and inactive at the SES facility. Message path Y is available.

CP1 issues TMPS to path X and sees the error-state-pending state.

CP1 issues TMPS to path Y and finds it not-error-state-pending.

CP1 decides that local vector recovery is not necessary since path Y is available for receipt of cross-invalidate (XI) or list notification commands.

Now path Y fails.

The SES facility 16 attempts to deliver an XI command to the CPC but finds no active paths.

CP1 sets the program-specified error indication for path X.

CP1 issues CMPS to path X, resetting the error-state-pending state.

CP1 issues IMP and AMP to activate path X at the SES facility 16.

CP1 now resets the program-specified error indication for path X, since it believes recovery to be complete.

CP1 is now executing a program wishing to test a local-cache vector entry.

CP1 issues TMPS to path X and finds it not-error-state-pending.

CP1 observes that the program-specified error indication is not set for path X.

CP1 issues TVE to a local vector accessed via path X.

At this point, a data integrity exposure has occurred, since CP1 did not clear local-cache vectors LCVs when recovery for path X was done, since path Y was available at that time. The XI lost when path Y failed, before path X was recovered, was not detected. If CP1 had re-checked path Y after recovery for path X, the failure of path Y would have been observed, and the potential for loss of an XI command would have been treated as cause to perform recovery for local vectors associated with the attached SES facility 16.

Serialization must be provided around the recovery for SES support facility 33 resources to prevent parallel recovery processes from resetting any message path error-state-pending or program-specified error indications, prior to the successful completion of recovery for all such affected resources. Otherwise, data integrity could be compromised.

The following scenario demonstrates this point. Assume message path X failed, has been physically repaired, and is now error-state-pending at the SES support facility 33 and inactive at the SES facility 16.

CP1 issues TMPS to path X and sees the error-state-pending state.

CP1 sets the program-specified error indication for path X.

CP1 issues CMPS to path X, resetting the error-state-pending state.

CP1 issues IMP and AMP to activate path X at the SES facility.

Path X now suffers a recursive error and error-state-pending is indicated again.

CP2 issues TMPS to path X and sees the error-state-pending state.

CP2 sets the program-specified error indication for path X.

CP2 issues CMPS to path X, resetting the error-state-pending state.

CP1 now resets the program-specified error indication for path X, since CP1 has completed recovery.

CP1 is now executing a program wishing to test a local-cache vector entry.

CP1 issues TMPS to path X and finds it not-error-state-pending.

CP1 observes that the program-specified error indication is not set for path X.

CP1 issues TVE to a local vector accessed via path X.

At this point, a data integrity exposure has occurred, since CP1 does not observe that recovery for path X is still in progress on CP2 and path X is currently unavailable until successful activation by CP2.

Recovery for SES support facility resources must be serialized with any program-initiated process to deactivate a message path which is currently involved in that recovery.

As stated earlier, the program is responsible to set a TI bit indication prior to execution of a DMP command, which can be tested in conjunction with the execution of a TMPS instruction, since the resulting inactive state of the path in the SES facility 16 is not observable via execution of a TMPS instruction.

Failure to provide the required serialization between SES support facility recovery and DMP processing can result in compromised data integrity.

The following scenario demonstrates this point. Assume message path X failed, has been physically repaired, and is now error-state-pending at the SES support facility 33 and inactive at the SES facility 16. Assume further that path X is the only path connecting the CPC to the attached SES facility 16.

CP1 issues TMPS to path X and sees the error-state-pending state.

CP1 sets the program-specified error indication for path X.

CP1 issues CMPS to path X, resetting the error-state-pending state.

CP1 issues IMP and AMP to activate path X at the SES facility 16.

CP1 enters a loop, issuing DEFINE VECTOR (DV) to clear all local-cache and list-notification vectors LCVs and LNVs associated with the attached SES facility 16.

CP2 issues a SET VECTOR ENTRY instruction to set local-cache vector entry (Z) in a vector which has already been cleared by CP1.

CP2 successfully issues a READ command to the SES facility 16 via path X, which has just been activated by CP1.

CP3 sets the program-specified error indication for path X.

CP3 issues a DMP command for path X, marking it inactive in the SES facility 16.

The SES facility 16 attempts to deliver an XI command to the CPC targeting local-cache vector entry (Z), but finds no active paths.

CP1 completes the DV loop recovery and resets the program-specified error indication for path X.

CP1 is now executing a program wishing to test a local-cache vector entry.

CP1 issues TMPS to path X and finds it not-error-state-pending.

CP1 observes that the program-specified error indication is not set for path X.

CP1 issues TVE to local-cache vector entry (Z).

At this point, a data integrity exposure has occurred, since CP1 does not observe that path X is not available for receipt of cross-invalidate commands from the attached SES facility 16, because the program-specified TI bit indication set by CP3 prior to execution of a DMP command to the SES facility 16 was allowed to proceed in parallel with the recovery for path X and associated local vector resources on CP1.

Define Vector (DV)

A bit vector of specified size (N) consisting of entries 0 through N−1 is established on the CPC, released, cleared to zeroes, expanded, or contracted and the result is indicated in the condition code.

Define Vector includes R1 and R2 fields. The R1 field designates the even-numbered register of an even-odd pair of general registers. The R2 field designates a single general register.

General register 1 contains an unsigned binary integer which indicates how the operation of DEFINE VECTOR proceeds and how the contents of the general registers are interpreted. The designated general registers may contain one or more of the following:

A local-cache token (LCT) currently assigned due to the execution of a preceding DEFINE VECTOR instruction.

A list-notification token (LNT) currently assigned due to the execution of a preceding DEFINE VECTOR instruction.

A unsigned binary integer indicating the number of bit vector entries (NBVE). The NBVE cannot be zero.

One of five operations is performed by DEFINE VECTOR depending on the contents of general register 1.

Operation Performed:
Define local-cache vector;
Define list-notification vector;
Release vector;
Clear vector;
Modify vector size.

Local-cache and list-notification tokens LCTs and LNTs are uniquely assigned between clear reset operations. Once a token has been first assigned and then released, that token may not be reused until a clear reset occurs. A token containing all zeroes is invalid. In interpretive execution mode, local-cache and list-notification tokens LCTs and LNTs are uniquely assigned for the image issuing the DEFINE VECTOR instruction.

A serialization function is performed before the operation begins and again after the operation is completed. As is the case for all serialization, this serialization applies only to this CPU; other CPUs are not necessarily serialized.

The execution of DV which results in making one or more bit vector entries available for reuse is not completed until all other CPUs and inter-system channels 18 in the configuration have completed any accesses to the vector entries being released.

The operations performed by DEFINE VECTOR are as follows:

Define Local-cache Vector (DLCV)

If the value in general register 1 indicates the define local-cache vector function then register R2 contains the number of local-cache bit vector entries to be defined. The contents of general registers R1 and R1+1 are ignored.

A local-cache token LCT is assigned to identify the local-cache bit vector being defined to the CPC. The LCT replaces the contents of the register pair designated by the R1 field. The local-cache token LCT provided may not be reassigned until after a clear reset function is performed.

A bit vector is established which consists of one bit for each local-cache bit vector entry requested. The leftmost bit of the bit vector is identified as bit zero. The rightmost bit is specified by one less than the number of local-cache bit vector entries. When a bit vector is established, all local-cache bit vector entries are zero. The LCT identifies the local-cache bit vector.

Define List-notification Vector (DLNV)

If the value in general register 1 indicates the define list-notification function, then register R2 contains the number of list-notification bit vector entries to be defined. The contents of general registers R1 and register R1+1 are ignored.

A list-notification token LNT is assigned to identify the list-notification bit vector being defined to the CPC. The LNT replaces the contents of the register pair designated by the R1 field. The list-notification token LNT provided may not be reassigned until after a clear reset function is performed.

A bit vector is established which consists of one bit for each list-notification bit vector entry requested. The leftmost bit of the bit vector is identified as bit zero. The rightmost bit is specified by one less than the number of list-notification bit vector entries. When a bit vector is established, all list-notification bit vector entries are zero.

A list-notification-vector local summary LNVLS is established and initialized to zero. The relationship of the list-notification-vector LNV to the list-notification-vector local summary LNVLS and to the list-notification-vector global summary LNVGS is established. The LNT identifies the list-notification bit vector and the associated list-notification-vector local summary LNVLS.

Release Vector (RV)

If the value in general register 1 indicates the release-vector function then register pair R1 contains a LCT or LNT to be released. The contents of general register R2 are ignored.

The local-cache token LCT or list-notification token LNT is released and the bits of the bit vector existing for that token are made available for reuse. The bit vector is said to no longer exist, and becomes undefined to the CPC. The bit-vector bits are not assigned for reuse until every bit has been cleared to zero.

Clear Vector (CV)

If the value in general register 1 indicates the clear-vector function then register pair R1 contains a LCT or LNT which designates a bit vector to be cleared to zeroes. The contents of general register R2 are ignored.

All entries in the designated bit vector are cleared to zeroes. When the designated bit vector is a list-notification bit vector, only the bit vector entries are cleared. The associated list-notification-vector local summary LNVLS remains unchanged.

Modify Vector Size (MVS)

If the value in general register 1 indicates the modify-vector function then register pair R1 contains a LCT or LNT which designates a bit vector to be modified.

The general register designated by the R2 field contains a unsigned binary integer indicating the number of bit vector entries (NBVE). The NBVE cannot be zero and is not to exceed the maximum number of bit vector entries supported by the CPC or CPC image.

A new number of bit vector entries is established for the bit vector identified by the LCT or LNT. The bit vector is redefined to the CPC. The LCT or LNT token remains the same. The bit vector, established by the preceding DEFINE VECTOR instruction which assigned the LCT or LNT, is expanded or contracted from its rightmost bit position to reflect the new number of bit vector entries.

If the bit vector is expanded, then the state of the bit vector entries reflected in the portion of the bit vector that existed prior to expansion remains unchanged, and the the bit vector entries reflected in the newly established portion of the bit vector are set to zeroes.

If the bit vector is contracted, then the state of the bit vector entries reflected by the remaining portion of the bit vector is unchanged, and the portion of the bit vector no longer needed may be reused after each bit is cleared to zero.

Condition code 0 is set if a vector is successfully defined, released, cleared or modified.

Condition code 1 is set to indicate that the requested number of bit vector entries could not be assigned and that the number of entries assigned was reduced to the number of entries actually available. The contents of general register R2 is changed to indicate the number of entries actually assigned. Condition code 1 can only be set for a define or modify vector size operation.

Condition code 2 is set and no other action is taken if space is not available for the establishment or expansion of a bit vector. This includes the cases where there is no space available for additional bit vector entries and where no additional tokens are available.

Condition code 2 only can be set for a define or modify vector size operation.

Condition code 3 is set and no other action is taken if the local-cache-token or list-notification token provided as input is not assigned. Condition code 3 can only be set for an release, clear, or modify operation. The setting of condition code 3 takes precedence over the setting of condition code 2.

Resulting Condition Code:

| | |
|---|---|
| 0 | Bit vector defined, released, cleared, or modified; |
| 1 | The number of bit vector entries assigned was less than requested; |
| 2 | Bit vector space or token is unavailable; |
| 3 | Input LCT/LNT not assigned. |

Any update to the bit vector space controls used to verify the validity of a local cache token/list notification token LCT/LNT or local cache entry/list notification entry LCEN/LNEN which results in making one or more bit vector entries available for reuse must be performed in a way which eliminates the possibility of another CPU or inter-system channel in the configuration from concurrently testing or updating a reassigned bit vector entry.

Tokens and space for bit vector entries are independently assigned and managed on a per-image basis. These resources are not shared across multiple images.

A process responsible for interrogating the message-path-state is executed on a periodic basis to detect message path failures and initiate recovery actions against local-cache vectors LCVs and list-notification vectors LNVs. The appropriate recovery action in cases where cross-invalidate or list-notification commands may have been lost due to the lack of an available message path is to over-indicate modification to local-cache data represented in a local-cache vector and to over-indicate list transition to the non-empty state for lists represented in a list-notification vector. Over-indication is achieved by clearing all vector entries to zero by means of the DEFINE VECTOR instruction.

For a list-notification vector, the recovery action includes placing both the list-notification-vector local summary associated with a cleared vector and the list-notification-vector global summary into the active state, in that order, via the SET VECTOR SUMMARY (SVS) instruction. This is done to provide an initiative to drive programs responsible for processing list transitions to the non-empty state. Failure to perform these actions in the order prescribed can result in the program entering a permanent wait state.

To eliminate the possibility of a list-notification or cross-invalidate command updating a bit vector entry after the entry has been reassigned by means of the DV instruction, the execution of the DV instruction is serialized with the execution of list-notification and cross-invalidate commands through use of a lock resident in the token table entry of the bit vector being processed.

An implementation may clear the bit-vector bits either when the bits are made available for reuse or when the bit vector is established.

The DEFINE VECTOR instruction may execute for a considerable amount of time, for example, when clearing the bit-vector bits of a bit vector that contains a large number of entries in order to make the vector available for reuse. To mitigate MP performance effects, a CPU responds during the execution of a DEFINE VECTOR instruction to any IPTE or SSKE requests received from other CPUs.

The DV instruction must execute a CPU quiesce function which will ensure all other CPUs have completed any accesses to vector entries being released as a result of DV execution. This approach eliminates the need to obtain explicit serialization in the frequently executed instructions (TVE, TVS). An example of the CPU quiesce function is part of the SSKE instruction as defined in the aforementioned POPs.

Set Vector Entry (SVE)

The value of the selected bit vector entry is set to one or reset to zero and the result is indicated in the condition code. No list-notification-vector local summary LNVLS or list-notification-vector global summary LNVGS is updated.

The R1 field designates the even-numbered register of an even-odd pair of general registers. The R2 field designates a single general register.

General register 1 contains an unsigned binary integer which indicates how the operation of SET VECTOR ENTRY proceeds. One of two operations is performed by SVE depending on the contents of general register 1.

Operation Performed:
Set vector entry to one (SVE);
Reset vector entry to zero (RVE).

The pair of general registers designated by the R1 field contains a local-cache token LCT or a list-notification token LNT currently assigned due to the execution of a preceding DEFINE VECTOR instruction. The LCT identifies a local-cache bit vector. The LNT identifies a list-notification bit vector.

The general register designated by the R2 field contains an unsigned binary integer, called the local-cache-entry number LCEN for local-cache bit vectors and list-notification-entry number LNEN for list-notification bit vectors, which selects an entry in the bit vector. The first entry in the bit vector is selected by a LCEN/LNEN of value zero. The last entry in the bit vector is selected by a LCEN/LNEN that is one less than the number of bit vector entries associated with this bit vector. The number of entries for this bit vector was established by a preceding DEFINE VECTOR instruction.

Condition code 0 is set and the bit vector entry selected by the LCEN/LNEN is set to one or reset to zero in the bit vector identified by the LCT/LNT.

Condition code 2 is set and no other action is taken if the LCEN/LNEN is greater than or equal to the number of bit vector entries associated with this bit vector.

Condition code 3 is set and no other action is taken if the designated LCT/LNT is not in the assigned state.

Resulting Condition Code:

0 Bit vector entry set to one or reset to zero;
1 —;
2 LCEN/LNEN too large;
3 Input LCT/LNT not assigned.

The high performance cache cross-interrogate function provided through the use of a local-cache vector is achieved by means of the SES-cache cross-invalidation process and the appropriate manipulation of the local-cache vector by programming before and after the execution of specific SES cache commands.

Set Vector Summary (SVS)

The value of the selected list-notification-vector local summary LNVLS or list-notification-vector global summary LNVGS is set to one or reset to zero and the result is indicated in the condition code. Setting or resetting the list-notification-vector local summary LNVLS has no effect on the list-notification-vector global summary LNVGS.

The R1 field designates the even-numbered register of an even-odd pair of general registers.

When the R1 field designates a general register other than general register 0, the pair of general registers designated by the R1 field contains a list-notification token LNT currently assigned due to the execution of a preceding DEFINE VECTOR instruction. The LNT identifies the selected list-notification-vector local summary LNVLS.

When the R1 field designates general register 0, the list-notification-vector global summary LNVGS is selected.

General register 1 contains an unsigned binary integer which indicates how the operation of the SET VECTOR SUMMARY instruction proceeds. One of two operations is performed by SVS depending on the contents of general register 1.

Operation Performed:
Set vector summary to one;
Reset vector summary to zero;

When R1 designates general register zero, condition code 0 is set and the list-notification-vector global summary LNVGS is placed into the set or reset state. When R1 designates an even general register other than zero, condition code 0 is set and the list-notification-vector local summary LNVLS designated by the LNT is placed into the set or reset state.

A serialization function is performed before the operation begins and again after the operation is completed. As is the case for all serialization, this serialization applies only to this CPU; other CPUs are not necessarily serialized.

Condition code 3 is set and no other action is taken if the designated LNT is not in the assigned state.

Resulting Condition Code:

0 Selected vector summary was set or reset;
1 —;
2 —;
3 Input LNT not assigned.

For each list-notification vector LNV created on the CPC there exists a list-notification-vector local summary LNVLS. As a program specified option of the register-list-monitor command, the list-notification-vector local summary LNVLS is set when any list-notification command is processed against the associated list-notification vector to reflect an empty to non-empty list transition. The list-notification-vector local summary LNVLS is not updated as a result of a non-empty to empty list state transition. The list-notification-vector local summary LNVLS is tested by the TEST VECTOR SUMMARY (TVS) instruction and set or reset by the SET VECTOR SUMMARY (SVS) instruction.

On a CPC there exists one list-notification-vector global summary per CPC image. The list-notification-vector global summary LNVGS is set when any list-notification-vector local summary LNVLS associated with the CPC image is set to reflect an empty to non-empty SES list state transition. The list-notification-vector global summary LNVGS is not updated as a result of a non-empty to empty list state transition. The list-notification-vector global summary LNVGS is tested by the TVS instruction and set or reset by the SVS instruction.

The operating system control program will utilize the list-notification-vector global summary LNVGS and list-notification-vector local summary LNVLS to provide an efficient system polling function on behalf of registered application programs. In this environment, TVS is first used to test the state of the list-notification-vector global summary LNVGS. If it is active, it is reset by means of the SVS instruction and TVS is executed against the list-notification-vector local summary LNVLS of each assigned list-notification vector LNV. For each active list-notification-vector local summary LNVLS identified by TVS, the SVS instruction is used to reset the list-notification-vector local summary LNVLS. TVE is executed against the individual entries in the list-notification vector LNV to identify empty to non-empty list transitions.

A process responsible for interrogating the message-path-state is executed on a periodic basis to detect message path failures and to initiate recovery actions against list-notification vectors LNVs. The appropriate recovery action in cases where list-notification commands may have been lost due to the lack of an available message path is to over-indicate list transition to the non-empty state for lists represented in a list-notification vector. Over-indication is achieved by clearing all vector entries to zero by means of the DEFINE VECTOR instruction.

For a list-notification vector LNV, the recovery action includes placing both the list-notification-vector local summary LNVLS associated with a cleared vector and the list-notification-vector global summary LNVGS into the active state, in that order, via the SET VECTOR SUMMARY (SVS) instruction. This is done to provide an initiative to drive programs responsible for processing list transitions to the non-empty state. Failure to perform these actions in the order prescribed can result in the program entering a permanent wait state.

Test Message Path State (TMPS)

The message-path-state of the selected message path is tested and indicated in the condition code.

General register 0 designate the inter-system channel path identifier of the selected message path.

Condition code 0 is set if the designated message-path-state of the selected message path is not error-state-pending.

Condition code 1 is set if the designated message-path-state of the selected message path is error-state-pending.

Condition code 3 is set when general register 0 designates an invalid inter-system channel.

Resulting Condition Code:

| |
|---|
| 0 Not error-state-pending; |
| 1 Error-state-pending; |
| 2 —; |
| 3 Invalid Inter-system channel. |

TEST MESSAGE PATH STATE does not perform a serialization or checkpoint-synchronization action. System performance would be degraded if either action were performed.

TMPS instruction execution is not alone sufficient to indicate that an available message path exists for message communication between the CPC and an attached SES facility.

A message path may be deactivated at the SES facility 16 upon execution of a deactivate-message-path (DMP) command initiated by the CPC 10. This action is not reflected in the message path state as registered at the SES-support facility 33 within the CPC 10. The program is responsible to ensure that the inactive state of a message path in the SES facility 16 directly resulting from the issuance of a DMP command by the program is understood in conjunction with the execution of a TMPS instruction.

Further, execution of a CLEAR MESSAGE PATH STATE (CMPS) instruction to a message path prior to the successful recovery and re-activation of that path via an activate-message-path (AMP) command will reset the error-state-pending indication. The program is responsible to ensure that the reset of the error-state-pending state of a message path which is unavailable until completion of path recovery, is understood in conjunction with the execution of a TMPS instruction to that message path.

A process responsible for interrogating the message-path-state of paths to a SES facility 16 is executed on a periodic basis to initiate SES-support facility recovery actions for any failed message path and for local-cache vectors LCVs and list-notification vectors LNVs accessed by the SES facility 16 over a failed message path. This initiative is sufficiently responsive so as to minimize the performance overhead associated with that part of local-cache vector interrogation responsible for path selection. Such processing will be elongated if it is necessary to issue TMPS to an alternate path when the path first selected is found to be error-state-pending.

Since the error-state-pending state of a message path observed via a TMPS instruction is not necessarily a reflection of the current operational state of the physical link, but is instead a residual indication that an error has previously occurred, it is appropriate to attempt immediate path recovery when a message path is found to be in this state.

The appropriate recovery action for message paths found to be error-state pending includes reset of the error-state-pending condition via execution of a CMPS instruction, followed by path validation and re-activation if necessary via an identify-message-path (IMP) and activate-message-path (AMP) command sequence.

The appropriate recovery action in cases where cross-invalidate or list-notification commands may have been lost due to the lack of an available message path is to over-indicate modification to cache data elements represented by entries in a local-cache vector LCV and to over-indicate list transition to the non-empty state for lists represented in a list-notification vector LNV. This action will allow normal processing against the local vectors to resume when a failed message path is subsequently repaired and activated.

When an ISC path fails or when a possible loss of a cross-invalidate or list-notification command on a channel path is detected, i.e., whenever the inter-system link leaves the operational-link configured state, the error-state-pending indication is set for that channel path.

It will be understood that the channel path error-state-pending indication may be provided by a physical hardware latch which can be tested as part of TMPS execution, or the error-state-pending indication may be returned as status provided by the inter-system channel in response to a direct request by a TMPS instruction.

Test Vector Entry (TVE)

The state of the selected bit vector entry is tested, and the result is indicated in the condition code.

The R1 field designates the even-numbered register of an even-odd pair of general registers. The R2 field designates a single general register.

The pair of general registers designated by the R1 field contains a local-cache token LCT or a list-notification token LNT currently assigned due to the execution of a preceding DEFINE VECTOR instruction. The LCT identifies a local-cache bit vector. The LNT identifies a list-notification bit vector.

The general register designated by the R2 field contains an unsigned binary integer, called the local-cache-entry number (LCEN) for local-cache bit vectors and list-notification-entry number (LNEN) for list-notification bit vectors, which selects an entry in the bit vector. The first entry in the bit vector is selected by a LCEN/LNEN of value zero. The last entry in the bit vector is selected by a LCEN/LNEN that is one less than the number of bit vector entries associated with this bit vector. The number of entries for this bit vector was established by a preceding DEFINE VECTOR instruction.

Condition code 0 is set if the bit vector entry selected by the LCEN/LNEN is one in the bit vector identified by the LCT/LNT.

Condition code 1 is set if the bit vector entry selected by the LCEN/LNEN is zero in the bit vector identified by the LCT/LNT.

Condition code 2 is set and no other action is taken if the LCEN/LNEN is greater than or equal to the number of bit vector entries associated with this bit vector.

Condition code 3 is set and no other action is taken if the designated LCT/LNT is not in the assigned state.

Resulting Condition Code:

```
0 Bit vector entry is one;
1 Bit vector entry is zero;
2 LCEN/LNEN too large;
3 Input LCT/LNT not assigned.
```

TEST VECTOR ENTRY does not perform a serialization or checkpoint-synchronization action. System performance would be degraded if either action were performed. All conceptually previous update references to the vector entry being tested are made observable as a result of other serialization actions initiated explicitly under program control.

Use of TVE provides a high performance means to determine the validity of a locally cached SES-cache data entry. To ensure updates to the shared data copy registered in the SES do not occur after TVE indicates validity of the locally cached copy and before the locally cached copy is processed by the program, serialization against modification of the SES resident copy must be held across the TVE execution and subsequent use of the data.

A local-cache vector entry is 1 when the associated locally cached data item is current with respect to the shared copy registered at the SES facility 16. A local-cache vector entry is 0 when the associated locally cached data item is not current with respect to the shared copy registered at the SES facility. Occasionally, over-invalidation of the locally cached copy may occur, as indicated by a local-cache vector entry of 0, even though the locally cached copy is current with respect to the shared copy registered at the SES facility.

The TVE instruction, when executed against a list-notification vector entry, indicates whether the SES list mapped by the list-notification vector entry is in the empty or non-empty state, provided list-state-transition-notification for the list has been enabled by means of the attach-list-structure-user and register-list-monitor commands. If the SES list is used by one system to pass messages or route transactions to another system, TVE may be used periodically by the receiving system to determine whether or not at least one element has been placed on the list without incurring the overhead associated with an unproductive physical access to the SES facility.

TVE is also used to determine the empty or non-empty state of a selected list after the TEST VECTOR SUMMARY instruction has indicated one or more list-notification events have been received and processed by the SES-support facility 33. The list-notification-vector local summary LNVLS and list-notification-vector global summary LNVGS are updated as a result of at least one list mapped in the list-notification vector LNV entering the non-empty state. Because a list-notification-vector local summary LNVLS is not updated, as a list-notification vector entry is, when a list becomes empty, it must be explicitly reset by the program through use of the SET VECTOR SUMMARY (SVS) instruction. As a consequence, without some form of program provided serialization, a list-notification-vector local summary LNVLS observed on one system may indicate a list transition to the non-empty state and persist even though another system had observed the state change and subsequently removed all elements from the list. Use of the TVE instruction prior to, and in close proximity of, SES command initiation may eliminate unproductive accesses to an empty list.

A list-notification vector entry is set to 1 as a result of list transition to the empty state. A list-notification vector entry is set to 0 as a result of list transition to the non-empty state. Occasionally, over-indication of a non-empty list may occur, as indicated by a list-notification vector entry of 0, even though the associated list is empty.

Test Vector Summary (TVS)

The current state of the selected list-notification-vector global summary LNVGS or list-notification-vector local summary LNVLS is indicated in the condition code.

The R1 field designates the even-numbered register of an even-odd pair of general registers.

When the R1 field designates a general register other than general register 0, the pair of general registers designated by the R1 field contains a list-notification token LNT currently assigned due to the execution of a preceding DEFINE VECTOR instruction. The LNT identifies the selected list-notification-vector local summary LNVLS.

When the R1 field designates general register 0, the list-notification-vector global summary LNVGS is selected. The contents of the pair of general registers designated by the R1 field are ignored.

Condition code 0 is set when the selected list-notification-vector global summary LNVGS or list-notification-vector local summary LNVLS is in the reset state.

Condition code 1 is set when the selected list-notification-vector global summary LNVGS or list-notification-vector local summary LNVLS is in the active state.

Condition code 3 is set and no other action is taken if the designated LNT is not in the assigned state.

Resulting Condition Code:

```
0 Vector summary is in the reset state;
1 Vector summary is in the active state;
2 —;
3 Input LNT not assigned.
```

TEST VECTOR SUMMARY does not perform a serialization or checkpoint-synchronization action. System performance would be degraded if either action were performed. All conceptually previous update references to the list-notification-vector summary LNVLS being tested are made observable by the operation performing the update. This includes update references under list-notification command and SET VECTOR SUMMARY (SVS) execution.

For each list-notification vector LNV created on the CPC 10 there exists a list-notification-vector local summary LNVLS. As a program specified option of the register-list-monitor command, the list-notification-vector local summary LNVLS is set when any list-notification command is processed against the associated list-notification vector LNV indicating an empty to non-empty list transition. The list-notification-vector local summary LNVLS is not updated as a result of a non-empty to empty list state transition. The list-notification-vector local summary LNVLS is tested by the TVS instruction and reset by the SVS instruction.

On a CPC 10 there exists one list-notification-vector global summary LNVGS per CPC image. The list-notification-vector global summary LNVGS is set when any list-notification-vector local summary LNVLS associated with the CPC image is set to indicate an empty to non-empty SES list state transition. The list-notification-vector global summary LNVGS is not updated as a result of a non-empty to empty list state transition. The list-notification-vector global summary LNVGS is tested by the TVS instruction and reset by the SVS instruction.

The operating system control program utilizes the list-notification-vector global summary LNVGS and list-notification-vector local summary LNVLS to provide an efficient system polling function on behalf of registered application programs. In such an environment, TVS is first used to test the state of the list-notification-vector global summary LNVGS. If it is active, it is reset by means of the SVS instruction, and TVS is executed against the list-notification-vector local summary LNVLS of each assigned list-notification vector LNV. For each active list-notification-vector local summary LNVLS identified by TVS, the following steps are taken:

The SVS instruction is used to reset the list-notification-vector local summary LNVLS.

Control is routed to the user program for list-notification vector LNV processing.

The user program identifies and processes the list transitions indicated in the list-notification vector LNV.

Control is routed back to the control program and the user program waits to be called again.

The test of the list-notification-vector global summary LNVGS is performed as often as required to meet list-transition response time objectives. Additional overhead associated with the test of each list-notification-vector local summary LNVLS is incurred only when the test of the list-notification-vector global summary LNVGS indicates at least one list-notification command was executed by the SES-support facility 33 to reflect an empty to non-empty state transition of a SES list.

SES-Support Facility Commands

Object references, command synchronization, and machine states are as discussed herein.

Cross-Invalidate

The reception of a cross-invalidate command by the SES-support facility 33 results in a cross-invalidate operation. The cross-invalidate command contains a local-cache token (LCT) and a local-cache-entry number (LCEN). The cross-invalidate operation includes invalidating the local-cache entry selected by the local-cache-entry number in the local-cache designated by the local-cache token by setting the selected local-cache bit vector entry to zero and indicating by a response to the SES facility that the cross-invalidate operation occurred.

The selected local-cache entry is invalidated by setting the selected local-cache bit vector entry to zero unless the local-cache-entry number is greater than or equal to the number of local-cache entries associated with this local cache 24 or unless the designated local-cache token is not in the assigned state. These conditions can occur if the size of the local cache 24 is modified or a local-cache token is released while a SES-cache-directory entry indicates validity for this user in the user-register entry. These conditions are considered to be a successful completion of the cross-invalidate command and a response code of 0 is returned.

When the cross-invalidate operation completes, the invalid state of the local-cache entry selected by the cross-invalidate operation is visible to any CPU in the configuration.

To eliminate the possibility of a cross-invalidate command updating a bit vector entry after the entry has been reassigned by means of the DV instruction, the execution of the DV instruction is serialized with the execution of the cross-invalidate command through use of a lock resident in the token table entry of the bit vector being processed.

The bit vectors are implemented in storage as part of the hardware system area (HSA) with more than one local-cache entry tracked per byte. Operations which update a bit-vector bit must do so with an interlocked update to the byte containing that bit. All store accesses and the fetch and store accesses associated with interlocked-update references by any other CPU or SES-support facility 33 are prevented from occurring at the same location between the fetch and the store accesses of an interlocked-update reference.

List-Notification

The reception of a list-notification command by the SES-support facility 33 results in a list-notification operation. The list-notification command contains a list-notification token (LNT), a list-notification-entry number (LNEN), a non-empty state change indicator (NESC), and a bit indicating whether list-notification-vector summary updates (SU) are required. The list-notification operation includes updating the list-notification entry selected by the list-notification-entry number in the list-notification bit vector designated by the list-notification token by setting the selected list-notification bit vector entry to zero if an empty to non-empty list transition occurred or to one if a non-empty to empty list transition occurred and indicating by a response to the SES facility that the list-notification operation occurred.

When NESC is one, the list state transition to non-empty is indicated in the selected list-notification entry by setting the selected list-notification bit vector entry to zero unless the list-notification-entry number is greater than or equal to the number of entries associated with this list-notification vector or unless the designated list-notification token is not in the assigned state. These conditions can occur if the size of the list-notification bit vector is modified or a list-notification token is released while the controls for the list indicate interest by this user in the list-notification-register entry. These conditions are considered a successful completion of the list-notification command and a response code of 0 is returned.

When NESC is zero the list state transition to empty is indicated in the selected list-notification entry by setting the selected list-notification bit vector entry to one unless the list-notification-entry number is greater than or equal to the number of entries associated with this list-notification vector or unless the designated list-notification token is not in the assigned state. These conditions can occur if the size of the list-notification bit vector is modified or a list-notification token is released while the controls for the list indicate interest by this user in the list-notification-register entry. These conditions are considered a successful completion of the list-notification command and a response code of 0 is returned.

When NESC is one, and the selected list-notification vector entry is updated, and SU is one, the list-notification-vector local summary designated by the list-notification token and the list-notification-vector global summary are placed into the active state.

When the list-notification command completes, the new state of the bit vector entry selected by the list-notification operation is visible to any CPU observing that bit vector entry by means of a TEST VECTOR ENTRY instruction. When the list-notification command completes, the new states of the list-notification-vector local summary and list-notification-vector global summary made active by the list-notification operation are visible to any CPU observing the list-notification-vector local summary or list-notification-vector global summary by means of a TEST VECTOR SUMMARY (TVS) instruction.

Updates to the list-notification vector object are performed in the following order: first the list-notification vector entry is set, followed by the list-notification local summary and then the list-notification global summary.

There may be a delay between setting the list-notification bit vector entry, list-notification-vector local summary and list-notification-vector global summary. This occurs, for example, in hardware recovery situations.

To eliminate the possibility of a list-notification command updating a bit vector entry after the entry has been reassigned by means of the DV instruction, the execution of the DV instruction is serialized with the execution of the list,notification command through use of a lock resident in the token table entry of the bit vector being processed.

The bit vectors are implemented in storage as part of the hardware system area (HSA) with more than one list-notification entry tracked per byte. Operations which update a bit-vector bit must do so with an interlocked update to the byte containing that bit. All store accesses and the fetch and store accesses associated with interlocked-update references by any other CPU or SES-support facility 33 are prevented from occurring at the same location between the fetch and the store accesses of an interlocked-update reference.

Implementation Example

This section describes a possible implementation for the SES-support facility 33. This design implements the bit vectors and associated structures in the hardware system area (HSA). Described are the following:
  LCT and LCEN operands,
  LNT and LNEN operands,
  List-Notification Mapping Structures,
  Local-Cache Mapping Structures,
  Assignment Structures,
  Local-Cache Bit Vector, and
  Bit Selection List-Notification Bit Vector.

Bit Selection

Two operands are required to identify a local-cache vector and select its corresponding bit-vector entry. One operand is a local-cache token, required to select the correct bit vector. The other operand is the local-cache-entry number, required to select the correct entry within the bit vector.

Two operands are required to identify a list-notification vector and select its corresponding bit-vector entry. One operand is a list-notification token, required to select the correct bit vector. The other operand is the list-notification-entry number, required to select the correct entry within the bit vector.

The format of a local-cache token LCT, as an operand of the DV, SVE, or TVE instruction or the cross-invalidate command, is shown in FIG. 7.

The fields in the LCT are shown in FIG. 7, and are:
  Image ID: The Image ID field can range from zero to N where a value zero is provided for native execution and N indicates the number of images that support the SES facility 16. A unique Image ID number from 1 to N is assigned to each image supporting the SES facility 16. For native execution or when no images need attachment to a SES facility 16, both N and the active image number are zero.
  INDEX: Identifies one of N local-cache vectors that could concurrently exist in the assigned state for this image.
  Assigned (A): When one, indicates that the local-cache token is assigned.
  Sequence Number: Used to insure that local-cache tokens are never reassigned except after a clear reset operation is performed.

Local-Cache-Entry Number (LCEN)

The format of a local-cache-entry number, the second operand of a SVE, or TVE instruction or the second parameter of the cross-invalidate command, is shown in FIG. 8.

The local-cache-entry number specifies the number of the bit vector entry. Bit vector entries are numbered beginning with zero.

List-Notification Token (LNT)

The format of a list-notification token, as an operand of the DV, SVE, TVS, SVS, or TVE instruction or the list-notification command, is shown in FIG. 9.

The fields in the LNT are allocated as follows:
  IMAGE ID

To facilitate the mapping of a LCT and LCEN number to a bit-vector entry, the following structures are provided:
  Local-Cache Token Table, and
  Local-Cache Bit Vector Space.

To facilitate the mapping of a LNT and LNEN number to a bit-vector entry, the following structures are provided:
  List-Notification Token Table, and
  List-Notification Bit Vector Space.

These structures as existing are located in HSA.

Local-Cache Token Table

Figure 11:
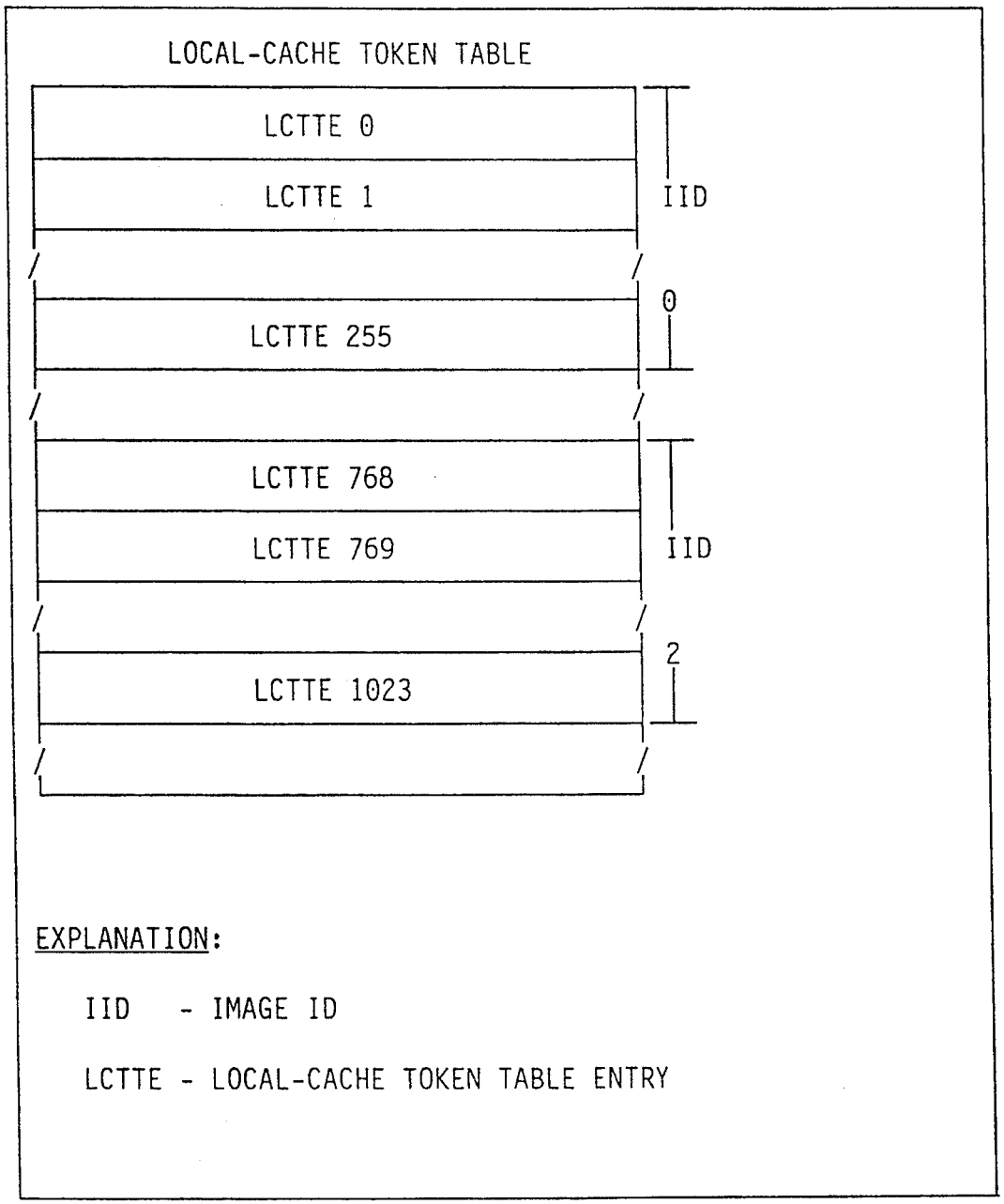
FIG. 11 illustrates a local-cache token table.

The local-cache token table is shown in FIG. 11. The local-cache token table contains N entries per image. Each entry corresponds to a local-cache bit vector that could be defined.

Each local-cache-token-table entry (LCTTE) is as shown in FIG. 12, and includes:
  Token Table Entry Lock (LOCK): Used to serialize the concurrent execution of a cross-invalidate command and DEFINE VECTOR instruction. The TTE is locked during DV execution when the sequence number in the LCT or the number of local-cache entries (NLCE) is updated. The lock is also held during cross-invalidate command execution.
  Number of Local-Cache Entries (NLCE): The image ID field can range from zero to N where a value zero is provided for native execution and N indicates the number of images that support the SES facility 16. A unique Image ID number from 1 to N is assigned to each image supporting the SES facility 16. For native execution or when no images need attachment to a SES facility 16, both N and the active image number are zero.

INDEX: Identifies one of N list-notification bit vectors that could concurrently exist in the assigned state for this image.

Assigned (A): When one, indicates that the list-notification token is assigned.

Sequence Number: Used to insure that list-notification tokens are never reassigned except following a clear reset operation.

List-Notification-Entry Number (LNEN)

The list-notification-entry number is shown in FIG. 10 and specifies the number of the list-notification bit vector entry. Bit vector entries are numbered beginning with zero.

Mapping Structures

A local-cache token-table entry contains an unsigned binary integer which indicates the number of entries in the local-cache. This value was contained in the second operand of the DV instruction which defined, expanded, or contracted the local-cache.

Bit-vector address: Contains the address of the first local-cache bit vector entry associated with this token.

Local-cache Token (LCT): A token-table entry contains the local-cache token assigned when the local-cache vector was defined. For execution of the SVE or TVE instruction and the release, clear, or modify operations of the DV instruction, this field must match the first operand of those instructions.

Local-Cache-Bit-Vector Space

An area is provided in HSA to contain the bit vectors for each image.

Local-Cache Working Storage

The local-cache-token-table origin (LCTTO), local-cache-bit-vector-space origin (LCBVSO) are contained in the local working storage of each CPU and SES-support facility. The number (N) of images supporting SES is contained in the local working storage of each SES-support facility. These values are established at initialization time.

List-Notification Token Table

Figure 13:
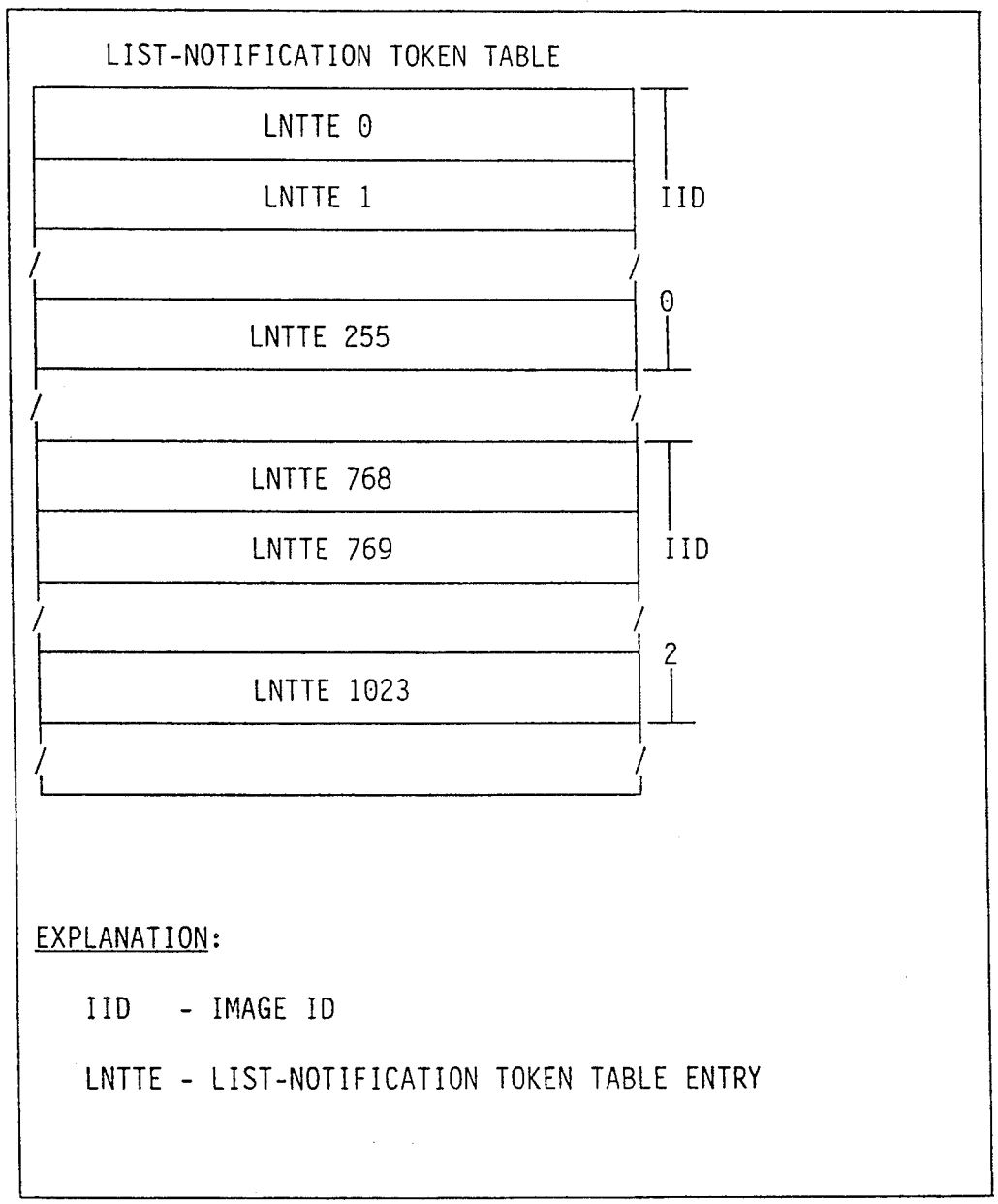
FIG. 13 illustrates a list-notification token table.

The list-notification token table is shown in FIG. 13. The list-notification token table contains N entries per image. Each entry corresponds to a list-notification vector that could be defined.

Each list-notification-token-table-entry (LNTTE) is shown in FIG. 14 and includes:

Token Table Entry Lock (LOCK): Used to serialize the concurrent execution of a list-notification command and DEFINE VECTOR instruction. The TTE is locked during DV execution when the sequence number in the LNT or the number of bit vector entries (NLNVE) is updated. The lock is also held during list-notification command execution.

List-Notification Token Summary (S): When one, indicates a list-notification command was executed which set an entry in the list-notification vector designated by the LNTTE to zero to indicate a SES list transition to the non-empty state. The bit is set to one by the list-notification command and reset to zero with the SET VECTOR SUMMARY (SVS) CPU instruction.

Number of List-Notification Vector Entries (NLNVE): A list-notification token-table entry contain an unsigned binary integer which indicates the number of entries in the vector. This value was contained in the second operand of the DV instruction which defined, expanded, or contracted the list-notification vector.

Bit-Vector Address: Contains the address of the first bit vector entry associated with this token.

List-Notification Token (LNT): Each list-notification-token-table entry contains the list-notification token assigned when a list-notification vector is defined. For execution of the SVE, TVS, SVS, or TVE instruction and the release, clear, or modify operations of the DV instruction, this field must match the first operand of those instructions.

List-Notification Global Summary Vector

The list-notification global summary vector contains a one bit entry per image. Each entry provides a summary indication of the execution of a list-notification command against any list-notification vector in the image. The LNGSV entry is set to one by the list-notification command and reset to zero by the SVS instruction.

List-Notification-Bit-Vector Space

An area of HSA storage is provided for each image.

Locations of Assignment Structures

The addresses of the assignment structures are located in a portion of HSA referred to as the CPU common area. These addresses can be located at fixed offsets from the beginning of the CPU common area. The vectors that exist for each image are kept sequentially in image number order. The same applies to the counters kept for each image. Each CPU contains in its local-working storage the address of the CPU common area.

Local Working Storage

The list-notification-mapping-table origin (LNMTO), list-notification-token-table origin (LNTTO), list-notification-global-summary-vector origin (LNGSVO), and list-notification-bit-vector-space origin (LNBVSO) are contained in the local working storage of each CPU and SES-support facility. The number (N) of images supporting SES is contained in the local working storage of each SES-support facility. These values are established at initialization time.

Programming

High level logic flows of key system software protocols supporting the local-cache invalidation, list-transition notification, and message path error recovery functions will now be discussed.

Figure 23:
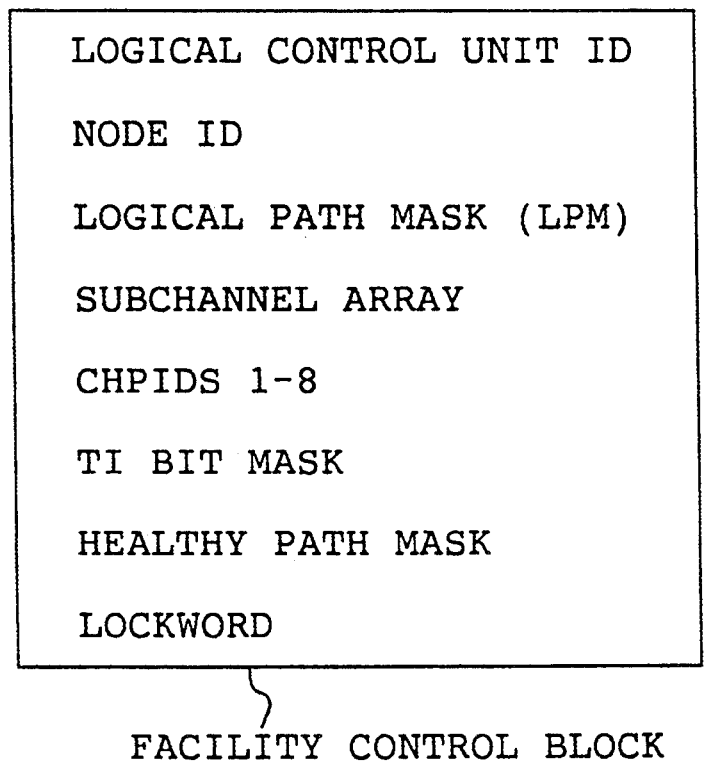
FIG. 23 is a diagram representing a facility control block of a SES facility.

Programming utilizes a Facility Control Block (FCB) shown in FIG. 23 in establishing and controlling access to a SES facility. One FCB is maintained in each operating system for each SES facility accessed. The FCB contains information used to identify a SES facility, determine the physical connections to a SES facility, maintain logical connections to a SES facility, and control the initialization and recovery of connections to a SES facility. The Logical Control Unit ID and Node ID are used to identify a SES facility. The Logical Control Unit ID is established through a definition procedure during which the SES facility is identified and connections between the system and the SES facility are defined. The Node ID is returned to the operating system in response to commands which establish active paths between the operating system and the SES facility. Physical connections between the system and the SES facility are represented by channel path IDs contained in the CHPIDS 1–8 fields of the FCB. The Logical Path Mask (LPM) is a bit mask identifying the CHPIDs which are configured correctly and logically available for operations between the system and the SES facility. The subchannel array associated with the FCB identifies the set of subchannels which are defined for maintaining operations between the system and the SES facility. The connectivity verification process determines the set of paths to the SES facility which are known to be correctly configured and both logically and physically available. The TI bit mask within the FCB is maintained by programming during path initialization and recovery to represent those CHPIDS identified as having been potentially unavailable since the last connectivity verification process was performed. A healthy path mask is built by progamming during path initialization and recovery to represent the paths to the SES facility which have been determined to be available by the connectivity verification process. The lock word within the FCB is used by programming to serialize concurrent initialization and recovery processes for the SES facility.

List-Notification Vector Polling

FIG. 15 illustrates the high level logic used by the MVS control program to detect changes in attached SES list user's list-notification bit vectors. The figure depicts the use of each list-notification-vector summary to detect list state changes from empty to non-empty and illustrates the dispatch of the attached user's program to process the state change.

Activate Message Path Activation (AMP)

FIG. 16 illustrates the high level logic used by the MVS control program to activate a message path after a SES command failure or as a result of a path re-configuration request.

Disabled Global Spin Lock is obtained to serialize the program control block structure representing the specific SES facility 16 to which path activation is being performed. This prevents path activation processing from running concurrently with SES-support facility recovery processing to the facility. Serialization against mainline processing executing the TLCE macro interface is provided via the TI bit.

Deactivate Message Path (DMP)

FIG. 17 illustrates the high level logic used by the MVS control program to de-activate a message path after a SES command failure or as a result of a path re-configuration request.

Disabled Global Spin Lock is obtained to serialize the program control block structure representing the specific SES facility 16 to which path de-activation is being performed. This prevents path de-activation processing from running concurrently with SES support facility recover processing for the facility. Serialization against mainline processes executing the TLCE macro interface is provided via the TI bit.

TLCE-intersect bit (TI)

As previously explained, a bit is defined to provide a recovery intersect for each message path maintained in a path group at the CPC 10 which connect to a given SES facility 16. In addition, a TI bit is defined in the TLCE status area, to be explained to correspond to the "primed" message path used for initial path selection via the TLCE macro interface. The TI bit is set whenever a message path is taken offline or undergoes asynchronous path recovery involving reset of the error-state-pending indication for the channel. The checking of the TI indicator avoids the need to obtain any strong serialization in the mainline processing to block concurrent recovery processing or path de-activation which would otherwise introduce significant performance degradation in the mainline path.

As mentioned, execution of the TMPS instruction is not alone sufficient to indicate that an available message path exists for communication between the CPC 10 and the attached SES facility 16.

A message path may be deactivated at the SES facility 16 upon execution of a deactivate message path DMP command initiated by the CPC 10. This action is not reflected in the message path state as registered at the SES-support facility 33 within the CPC 10. The program is responsible to ensure that the inactive state of a message path in the SES facility 16 directly resulting from the issuance of DMP command by the program is understood in conjunction with the execution of a TMPS instruction.

Further, execution of a CLEAR MESSAGE PATH STATE (CMPS) instruction to a message path prior to the successful recovery and re-activation of that path via an activate-message-path AMP command will reset the error-state-pending indication. The program is responsible to ensure that the reset of the error-state-pending state of a message path which is unavailable until completion of path recovery, is understood in conjunction with the execution of a TMPS instruction to that message path.

Test Local-Cache Entry (TLCE) Macro

FIGS. 18A and 18B, taken together, illustrate the TLCE inline macro expansion and the format of the TLCE status area used to contain the TLCE intersect bit (TI), the inter-system channel identifier to be tested by the TMPS instruction, and the address of the software control block containing facility related information including the identity of all paths leading to the SES facility 16.

This service provides an efficient and highly responsive mechanism for determining cache coherency of a locally cached data item. This is achieved through interrogation of the requested local cache vector entry addressed via a local cache token LCT and specific bit vector entry number after first determining the integrity of the bit vector through verification that a healthy path to the associated SES facility 16 exists for the receipt and processing of cross-invalidate commands. Programming holds serialization on the locally cache data item across the macro service invocation as shown in FIG. 19 at 250 so that an atomic view of the local cache vector state can be provided without being compromised by concurrent write activity to the data object.

Figure 19:
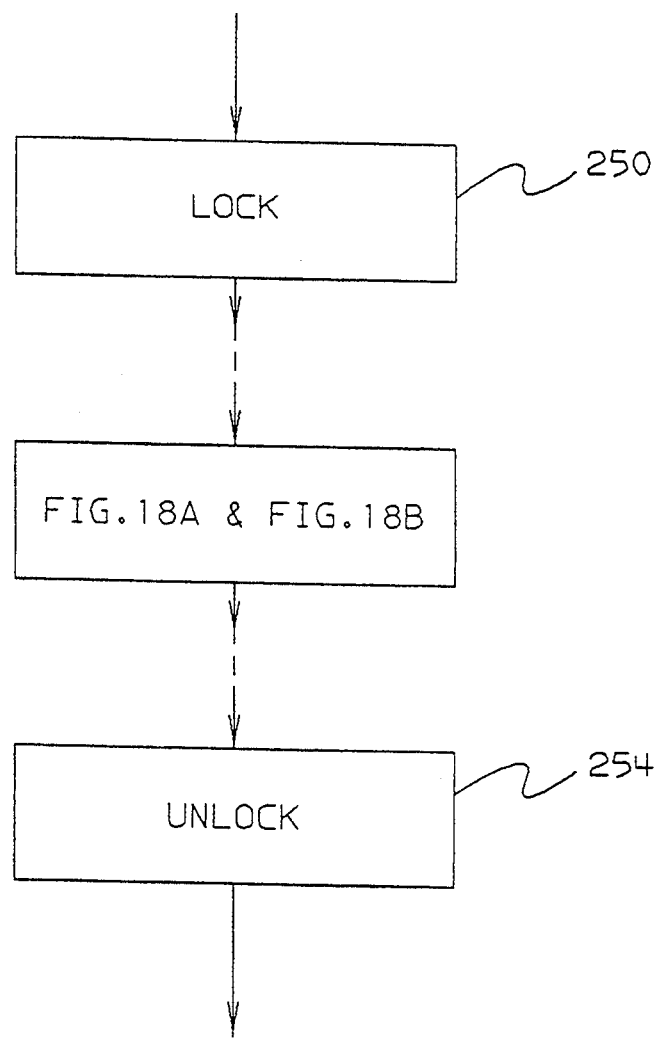
FIG. 19 is a block diagram of a procedure including the procedure of FIGS. 18A and 18B, for insuring the integrity of data objects used to maintain state information for shared data.

After data references are completed, the data is unlocked at 254 of FIG. 19. Locking and unlocking is done as disclosed in U.S. patent application Ser. No. 07/860,808 filed Mar. 30, 1992 for "Method and Apparatus for Distributed Locking of Shared Data, Employing a Central Coupling Facility" by Elko et al, incorporated herein by reference.

A TMPS is issued prior to, and in conjunction with, the execution of one or more TEST VECTOR ENTRY (TVE) instructions issued for the purpose of interrogating an entry in a specified local-cache vector LCV. This is necessary to ensure that an available path exists for the receipt of cross-invalidate commands directed by the SES facility 16 to that local cache vector. TMPS should specify a channel path which represents a physical connection between the CPC 10 and the attached SES facility 16. Execution of a TVE instruction to a local-cache vector LCV without first verifying that an available path to the attached SES facility 16 exists could result in the interrogation of residual local-cache vector data and compromise data integrity.

Serialization against modification of a data element registered in SES must be held across the execution of both a TMPS and related TVE instructions, to ensure updates to a shared copy of the locally-cached data element do not occur between the time that TMPS indicates the presence of an available path and subsequent execution of the TVE instruction.

It is possible for a message path failure to occur in the window of time between the execution of a TMPS and corresponding TVE instruction(s). The required serialization will ensure that such a failure, undetected during this window, does not result in the loss of a cross-invalidate command directed to the local-cache-vector entry which is the target of the TVE instruction(s).

It is only necessary for the program to find one path available for the receipt of cross-invalidate or list-notification commands in order to rely on the integrity of the local-cache vector LCV or list-notification vector LNV. This is possible because the SES facility 16 cannot consider cross-invalidate or list-notification processing successfully completed until the command has been processed by a target CPC or action has been taken to cause the error-state-pending condition to be indicated and made observable for all message paths to the target CPC which were active at the time of command execution.

TLCE Status Area

A status area is provided in fixed central storage which is primed with a healthy path to the SES facility 16 to avoid the overhead associated with path selection processing required for specification of a target path on the TMPS instruction.

TLCE Service Routine

FIG. 20 illustrates the high level logic flow of the TLCE service routine. The service routine is called from the TLCE macro expansion when the contents of the TLCE status area are not valid or when the TMPS executed against the specified message path presented a non-zero condition code.

The TLCE service routine is responsible for finding an available message path and executing the TVE instruction against the designated local-cache vector entry. If an available message path is found, the condition code presented by TVE is returned to the caller. Otherwise, condition code 1 is returned to indicate the locally cached data page being tested is not current with respect to the shared copy registered at the SES facility.

The service routine schedules an SRB to asynchronously perform recovery of SES-support facility resources so that the overhead of such processing does not delay the execution of the mainline path.

CPU disablement is required in the TLCE service routine to ensure that resource reclamation of the message facility control block (when a facility is taken offline) does not run concurrently with this mainline process. Such resource reclamation is performed using the known MVS bind-break mechanism to serialize against disabled processes running concurrently on other CPUs. This avoids overhead which would otherwise be incurred if a strong lock were required to serialize mainline execution against resource cleanup processes.

SES-Support Facility Recovery Routine

FIGS. 21A and 21B, taken together, illustrate the high level logic flow of the SES-support facility recovery routine. The routine is scheduled to run asynchronously from the TLCE service routine. The routine is responsible for the re-activation of failed message paths. The routine is also responsible for clearing local-cache and list-notification vectors LCVs and LNVs if it is determined that a period of time existed in which no message path to the facility was available to process cross-invalidate and list-notification commands.

Disabled Global Spin Lock is obtained to serialize the program control block structure representing the specified SES facility 16 for which recovery is being performed. This is required to prevent path de-activation processing from running concurrently with SES support facility recovery processing for the facility. It is also required to prevent concurrent SES facility recovery processes from running in parallel which could erase indications of recursive path failures, for example, prior to completion of recovery for all failures. Serialization against mainline processes executing the TLCE macro interface is provided via the TI bit.

Path Recovery Subroutine

FIG. 22 illustrates the high level logic used by the MVS control program to recover a path.

Figure 24:
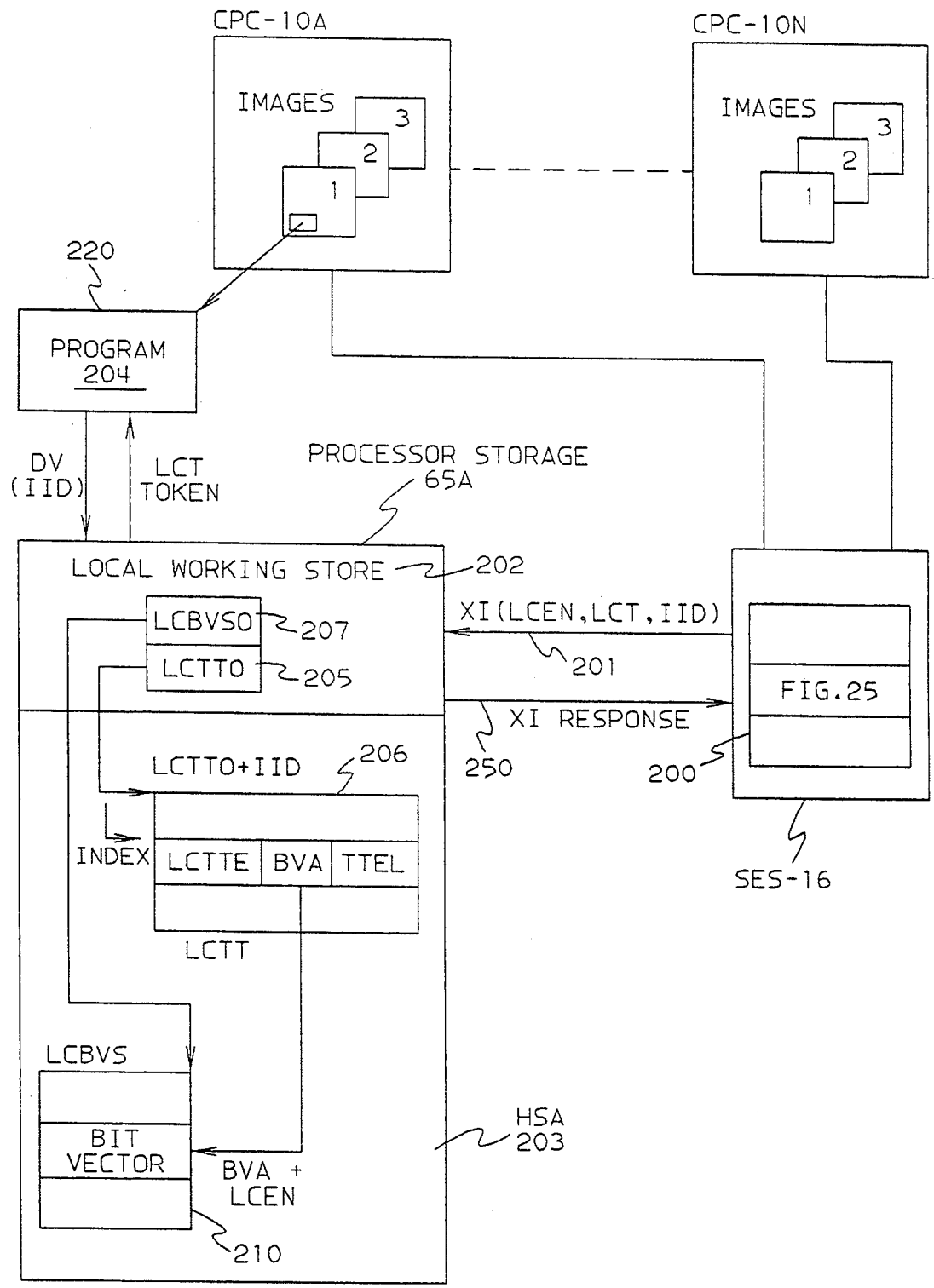
FIG. 24 is a block diagram of a portion of the system of FIG. 1 showing that portion of processor storage in which a local-cache token table and local-cache bit vector entries are stored.
Figure 25:
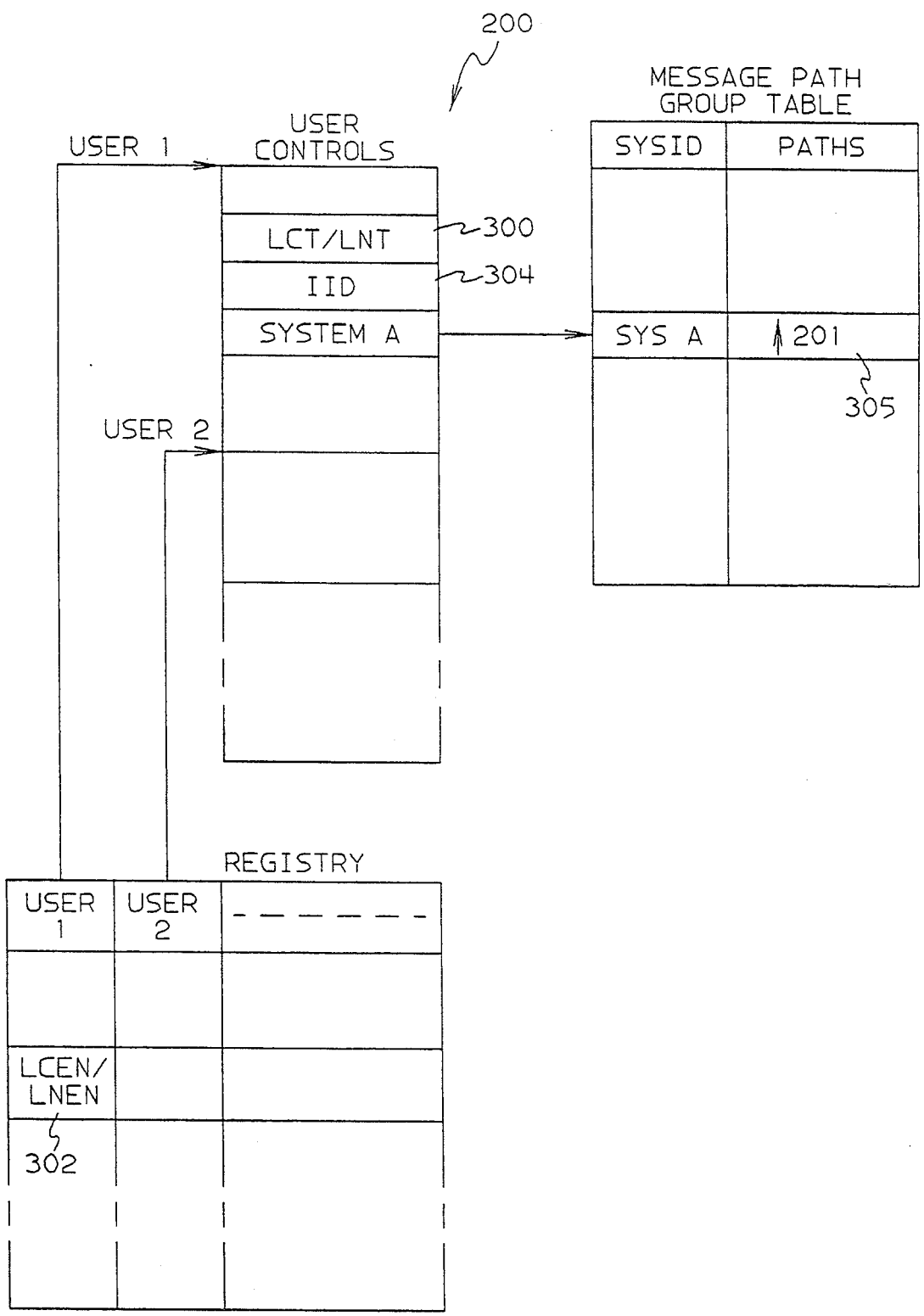
FIG. 25 is a representation of the tables established in a SES facility of FIG. 1 for providing vector addressing information.

FIG. 24 is a block diagram of a portion of the system of FIG. 1 showing the local-cache token table and the local-cache bit vector storage area for providing access to a bit vector entry of interest. Tables 200, more fully shown in FIG. 25, are established in the SES facility 16 to register message paths between the SES facility 16 and images in each of the CPCs 10A-10N. These tables are disclosed in the aforementioned U.S. patent application Ser. No. 07/860,647, incorporated herein by reference.

Each CPC includes processor storage 65A, of FIG. 6. The processor storage 65A includes program inaccessible storage which further includes local working storage 202 and HSA 203, both of which are well known. A program 204 resides in main storage 220 of the CPC and is executed by the CPU in the CPC on behalf of an image, in a manner well known in the art. The program issues a request to an MVS operating system service to use a DV instruction to define a local-cache vector, as previously described. It will be understood that the present example relates to operations of local-cache vectors, but that the discussion herein equally applies to list-notification vector operations.

As previously discussed, at CPC initialization time, a local-cache-token-table origin (LCTTO) 205 is established in the local working storage 202. The LCTTO 205 points to the origin of the local-cache token table in 206 in the HSA for containing vector control objects. Also at CPC initialization time, a local-cache-bit-vector-space origin (LBVSO) 207 is established in local working storage 202, which LBVSO 207 points to the origin of the local-cache-bit-vector space 210 in the HSA 203 for storing vector entries. Upon receipt of the request to the mentioned MVS operating system service to create a bit vector, MVS issues the DV instruction to establish an entry LCTTE in the LCTT 206 and assigns a local-cache token LCT for the requested bit vector. The LCT is written into the LCTTE with a bit vector address which points to the first bit vector entry for this bit vector in the LCBVS 210. The LCT is then returned to MVS which returns the LCT to the program 204. It will thus be understood that, while the program cannot directly access the bit vector, it instructs MVS to return a token which identifies the location of the bit vector. This opaque token can then be used by the program 204 or by the channel subsystem to access the bit vector.

As disclosed in the aforementioned U.S. patent application Ser. No. 07/860,805, incorporated herein by reference, the LCT is stored in the SES facility 16 and associated with the status of shared data. When the status of the shared data changes, generated commands, for example generated commands such as XI commands, are sent from the SES facility to the CPC. One such XI command is shown being sent over message path 201 from the entry 305 of the message path group table of FIG. 25. As previously explained, the XI command includes the LCT 300, and local-cache-entry number (LCEN) 302 and an image ID (IID) 304 from the tables 200 of FIG. 25. The channel subsystem uses the IID from the XI command to locate the proper set of entries in the LCTT 206. The index portion of the LCT from the XI command is used to locate the proper entry within the set of selected LCTT entries for the image as shown in FIG. 24. The token-table entry is locked using the token-table-entry lock (TTEL) to prevent the represented bit vector from being changed before this operation is completed. The LCT in the located LCTT entry is compared to the LCT from the XI command to validate access to the target vector. Using the bit vector address BVA in the token-table entry and the LCEN from the XI command, the proper bit entry in the bit vector is located and reset. A response is then sent to the SES facility from the support facility as shown at 250.

In a similar way, a DV instruction serializes accesses to a vector control object located by an LCT. If the bit vector is a list-notification vector LNV, a DE instruction may be executed using an LNT in a similar manner.

After the requested operation is complete, the TTEL lock for that LCTTE/LNTTE is released such that further serialize bit vector operations for the same LCTTE/LNTTE may be executed.

Figure 26:
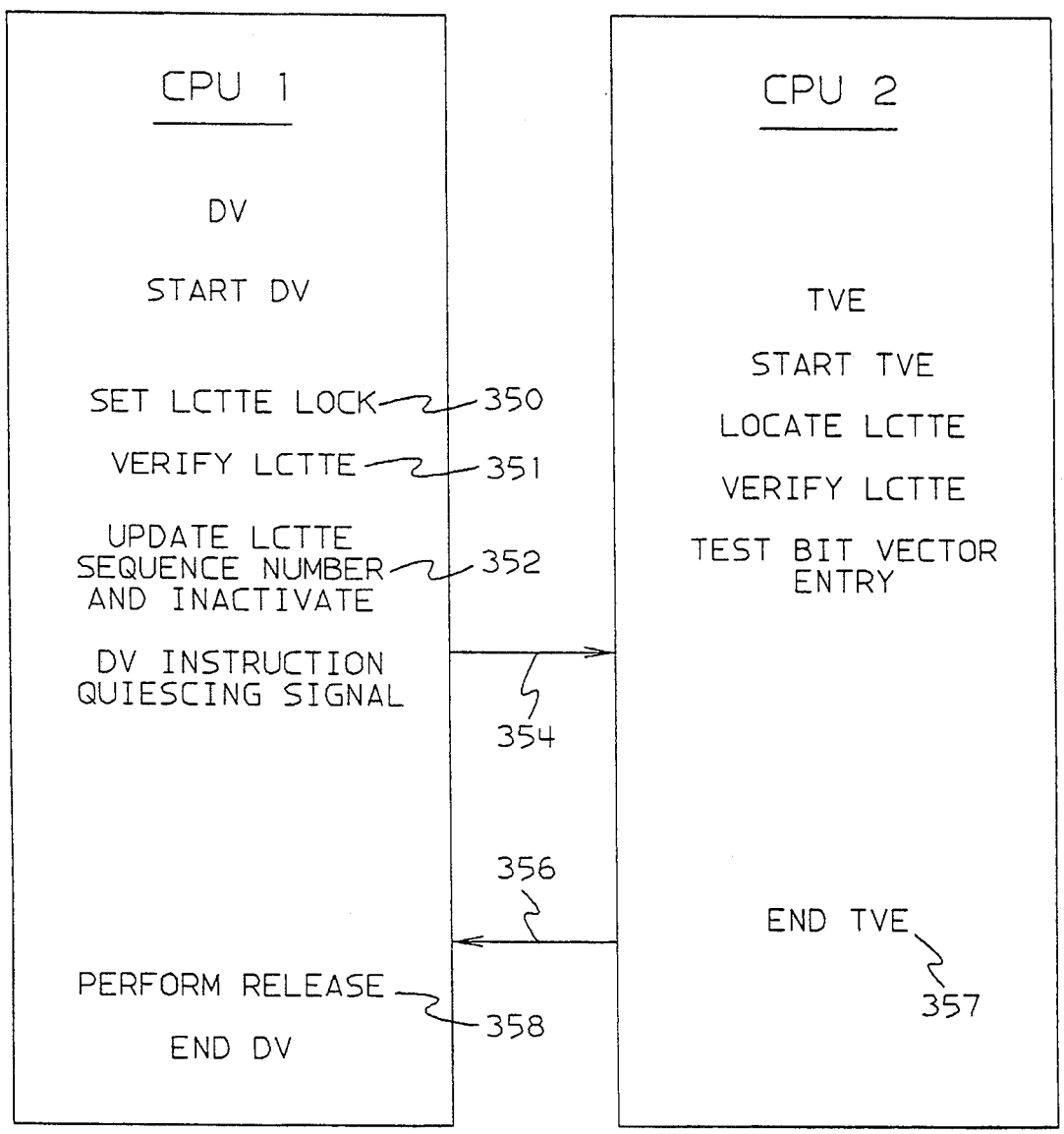
FIG. 26 is a high level logic diagram showing the serialization programs being executed in two different CPUs.

FIG. 26 is a high level logic diagram showing the serialization of two programs being executed in two CPUs of the system. The program executing in CPU 1 of a type which operates on the vectors stored in the HSA 203 such as, for example, a DV instruction. The type of commands in CPU 2 is of the type that only tests a vector such as, for instance, a TVE command.

It is the responsibility of the first type of instruction to not complete its operation until the concurrent execution of an instruction the second type is complete to make sure that the second type is not testing vectors which may be reassigned, for instance, by the first type. This is also a performance enhancement since the first type are performed relatively infrequently when compared to the second type. In FIG. 26, the first type, sets the lock at 350, verifies that it has accessed the correct LCTT entry at 351, updates the LCTT entry sequence number at 352 such as when another token is going to be reassigned to the LCTT entry, and then sends an instruction quiescing signal at 354. Such instruction quiescing signals instructions are well known. The first type in CPU1 will not continue until receiving a response at 356 indicating that the second type executing in CPU2 is ended at 357. The first type may then continue at 358.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A data processing system for the management of data objects used to maintain state information for shared data, said data processing system comprising:
   a central processor for executing instructions arranged in programs for processing data;
   a main storage connected to said central processor, said main storage for storing data and said program, said main storage further being divided into a program accessible portion and a program inaccessible portion;
   a vector means in the program inaccessible portion of said main storage for containing one or more vectors, each vector having a vector control object and one or more entries, each entry having states the meaning of which are program defined; and
   program means having instructions executable by said central processor, said program means including data area defining means for defining a data area in said program inaccessible portion of said main storage for storing a vector in said vector means thereby providing protected access to said vector through said program means by programs stored in said main storage.

2. The data processing system of claim 1 wherein said area defining means includes means for defining areas in said data area to include vector and vector summary areas.

3. The data processing system of claim 2 wherein said defining means further divides said vector summary area into multiple areas comprising a local summary and global summary areas, said local summary area reflecting changes in a single vector in said vector means, and said global summary area reflecting changes in any vector in said vector means.

4. The data processing system of claim 3 wherein said vector means includes:
   a multiple entry table, each entry for containing the vector control object of one of the vectors contained in said vector means;
   a vector bit space for containing entries of the vectors in said vector means; and
   a pointer in each entry of said table, each pointer pointing to the beginning entry of its vector in said vector bit space.

5. The data processing system of claim 4 wherein each entry of said multiple entry table includes a field for containing the local summary area of a data area defined by said defining means.

6. The data processing system of claim 3 wherein said vector means includes a multiple entry global space, each entry containing one of said global summary areas.

7. The data processing system of claim 3 wherein said program means includes a set vector summary instruction for setting to a desired state, a specified summary area.

8. The data processing system of claim 3 wherein said program means includes a test vector summary instruction for testing to determine the state of a specified summary area.

9. The data processing system of claim 1 wherein each vector control object contained in said vector means includes a type field, and said defining means includes vector defining means for defining a vector and its type field in said data area.

10. The data processing system of claim 9 wherein said type field comprises of a local cache vector and a list notification vector, and said vector defining means defines each vector type depending on its type field.

11. The data processing system of claim 9 wherein said vector means includes multiple entry tables, each entry of a first table containing a vector control object of a local cache vector, and each entry of a second table containing a vector control object of a list notification vector.

12. The data processing system of claim 1 wherein said data area defining means includes token generating means for generating a unique token for identifying the location of the vector in said data area defined by said defining means.

13. The data processing system of claim 12 wherein said program means includes a set vector entry instruction for setting to a desired state, an entry of the vector identified by said token.

14. The data processing system of claim 12 wherein said program means includes a test vector entry instruction for testing to determine the state of an entry of the vector identified by said token.

15. The data processing system of claim 1 further comprising:
a support facility connected to said main storage, said support facility having
receiving means for receiving an effective address, and
addressing means connected to said receiving means for converting said effective address to an address for accessing said data area.

16. The data processing system of claim 15 wherein said receiving means also receives commands and instructions, said support facility further comprising processor means connected to said receiving means and responsive to said addressing means, said processor means for executing commands and instructions received by said receiving means for updating said data area accessed by said addressing means, said processor executing commands and instructions separate from and without interruption to the execution of programs by said central processor.

17. The dataprocessing system of claim 16 wherein said support facility further comprises response means for signalling completion of said commands and instructions at which time all modifications of said data area are observable to programs being executed by said central processor.

18. The data processing system of claim 16 further comprising:
a structured external storage (SES) facility for storing data including representations of shared data and state information of said shared data;
a command sending means in said SES facility connected to said receiving means of said support facility, said command sending means for sending commands and effective addresses to said support facility for operating on said data area accessed by said addressing means.

19. The data processing system of claim 16 wherein said program means includes means for sending instructions and effective addresses to the receiving means of said support facility, each of said instructions for operating on said data area accessed by said addressing means.

20. The data processing system of claim 19 wherein the instructions of said program means includes instructions for creating and releasing said data area, and instructions for modifying size and clearing of vectors in said data area.

21. The data processing system of claim 20 wherein said processor of said support facility comprises control means for controlling and monitoring the creation and deletion of data areas and the modifying size and clearing of vectors in said data areas.

22. The data processing system of claim 16 wherein said support facility includes serializing means for serializing changes to said data area such that an operation on said data area cannot be started until all previous operations on the data area are complete.

23. The data processing system of claim 22 wherein said serializing means comprises:
lockword setting means in said addressing means for setting a lockword stored in the vector control object in said data area, in a first state when an operation on the data area has been started and resetting said lockword in a second state when the operation on the data area has been completed; and
enabling means in said serializing means for enabling the starting of operations on the data area identified by the effective address received by said receiving means only when the lockword stored in the vector control object identified by said effective address, is in its second state, thereby serializing operations on the data area.

24. The data processing system of claim 15 wherein said support facility includes validating means in said addressing means for validating effective addresses being converted by said addressing means.

25. The data processing system of claim 24 further comprising:
token generating means in said program means for generating a unique token for identifying the location of the vector in said data area defined by said defining means;
means in said defining means for storing said token in the vector control object in the data area identified by said token;
said effective address received by said receiving means includes an effective address token; and
comparing means in said validating means for comparing the effective address token received by said receiving means with the token stored in the vector control object in the data area identified by the effective address token for validating that the token stored in the vector control object and the effective address token are the same.

26. The data processing system of claim 25 wherein said area defining means includes means for storing in each vector control object in said vector means, a value specifying the maximum number of entries defined for each vector when each vector is placed in said vector means, the effective address received by said receiving means includes an entry number, and said validating means includes means for comparing the entry number of the effective address with the value of the maximum number of entries for the vector identified by the effective address token to verify that the entry number requested is not greater than the maximum number of entries defined for that vector.

27. The data processing system of claim 25 wherein the token of the effective address received at the receiving means includes an active bit and a sequence number, said data processing system further comprising:
data area releasing means in said program means for removing a data area from said vector means, said data area releasing means for resetting to an inactive state, an active bit in the token stored in said vector control object for the data area to be released;

incrementing means in said data area releasing means for incrementing a sequence number in the token in the vector control object stored in the data area to be released, and active determining means in said validating means for determining that the active bit is in its active state for the token stored in said vector control object identified by an effective address received at said receiving means, and for comparing the sequence number of the token received at said receiving means with the sequence number of the token stored in said vector control object, thereby verifying that the token of the effective address is for an active vector with a correct sequence number.

28. The data processing system of claim 18 wherein said main storage includes one or more images, each image supporting one operating system, said main storage further having separate image areas in said vector means for different supported images, and wherein the effective address received by said receiving means includes a protected image identification (IID) identifying the image which is the source of the instruction received by said receiving means, said data processing system further comprising IID means in said addressing means for addressing the image area for the IID of the effective address received by said receiving means.

29. The data processing system of claim 28 wherein said central processor, said main storage said program means, and are in a central processing complex (CPC), and said SES facility is connected to one or more other similar CPCs, the main storage of each of said CPCs including one or more images, each image supporting one operating system, each main storage of said CPCs further having separate image areas in its vector means for different images supported by said CPCs, and wherein the effective address received by said receiving means from said SES facility includes a protected IID, said SES facility further comprising:

IID forwarding means in said command sending means and connected to said CPCs, said IID forwarding means for receiving from and including in the effective address to be sent to said receiving means, the IID of the image on whose behalf a command is being generated by said command generating means;

said command sending means having means for sending the command generated by said command generating means and an effective address including said IID to said receiving means of said support facility.

30. The data processing system of claim 24 further comprising a second serializer in said support facility, said second serializer serializing the execution of a first type of command or instruction (first type) with the execution of a second type of instruction (second type) such that said first type will not change said data area until completion of said second type, said second serializer comprising:

vector control object updating means for updating said vector control object to make said validity means in said addressing means detect an invalidate effective address, quiescing signal generating means in said first type for sending a quiescing signal to said second type, said quiescing signal being sent by said quiescing signal generating means before said first type changes said data area;

delaying means in said first type for preventing continuation of said first type until receiving a response to said quiescing signal;

response generating means in said second type for generating a response signal to said quiescing signal, said response signal being generated only after the end of said second type; and continuation means in said first type for continuing the execution of said first type only after the receipt of said response signal from said second type, thereby serializing concurrent execution.

31. A data processing system for the management of data objects used to maintain state information for shared data, said data processing system comprising:

multiple central processors for executing instructions arranged in programs for processing data;

a main storage connected to each of said central processors, each main storage for storing data, said programs, and one or more system images, each image supporting one operating system, each main storage further being divided into a program accessible portion and a program inaccessible portion;

vector means in the program inaccessible portion of one main storage for containing one or more vectors, each vector having a vector control object and one or more entries, each entry having states the meaning of which are program defined, said vectors for maintaining state information for data shared among a set of said central processors; and program means having instructions executable in the central processor connected to said one main storage, said program means including data area defining means for defining a data area in said program inaccessible portion of said one main storage for storing a vector in said vector means thereby providing protected access to said vector through said program means.

* * * * *